United States Patent
Magnuson et al.

(10) Patent No.: US 10,339,299 B1
(45) Date of Patent: Jul. 2, 2019

(54) RUNTIME MANAGEMENT OF APPLICATION COMPONENTS

(71) Applicant: Kashmoo, Inc., Austin, TX (US)

(72) Inventors: Mark D. Magnuson, Leander, TX (US); Timothy J. Magnuson, Cedar Park, TX (US)

(73) Assignee: Kashmoo, Inc., Austin, TX (US)

( * ) Notice: Subject to any disclaimer, the term of this patent is extended or adjusted under 35 U.S.C. 154(b) by 151 days.

(21) Appl. No.: 15/451,678

(22) Filed: Mar. 7, 2017

Related U.S. Application Data

(60) Provisional application No. 62/305,257, filed on Mar. 8, 2016.

(51) Int. Cl.
*G06F 21/52* (2013.01)
*H04L 9/32* (2006.01)
*G06F 21/10* (2013.01)

(52) U.S. Cl.
CPC ............ *G06F 21/52* (2013.01); *G06F 21/105* (2013.01); *H04L 9/3236* (2013.01); *G06F 2221/033* (2013.01)

(58) Field of Classification Search
CPC .. G06F 21/52; G06F 21/105; G06F 2221/033; H04L 9/3236
See application file for complete search history.

(56) References Cited

U.S. PATENT DOCUMENTS

| | | | | |
|---|---|---|---|---|
| 7,272,228 | B2* | 9/2007 | Atkin | G06F 21/52 380/264 |
| 8,522,015 | B2* | 8/2013 | Goldsmid | G06F 21/53 705/59 |
| 2002/0112161 | A1* | 8/2002 | Thomas, III | G06F 21/10 713/176 |
| 2003/0156719 | A1* | 8/2003 | Cronce | G06F 21/10 380/256 |
| 2004/0158742 | A1* | 8/2004 | Srinivasan | G06F 21/10 726/4 |
| 2004/0193889 | A1* | 9/2004 | Satake | H04L 63/0823 713/176 |

(Continued)

OTHER PUBLICATIONS

"Operating System Concepts 8th Edition", by Silberschatz et al, 2009, John Wiley & Sons. (hereinafter "Silberschatz et al.").*

(Continued)

*Primary Examiner* — Robert B Leung
*Assistant Examiner* — Thomas Ho
(74) *Attorney, Agent, or Firm* — Fish & Richardson P.C.

(57) ABSTRACT

Techniques are described for runtime checking of function metadata prior to execution of a function in an environment. An application may include any appropriate number of components at one or more levels in a hierarchical arrangement, and each component may be packaged with metadata that describes the component. A function, or any component, may be packaged with metadata that includes term(s) governing the usage of the function. The term(s) may be checked, at runtime, during execution of the application to determine whether the function is to be executed. A function may also be hashed at runtime for verification of function version. Function(s) may be individually and independently executed as containerized nano functions within the environment.

20 Claims, 11 Drawing Sheets

(56) References Cited

U.S. PATENT DOCUMENTS

| | | | | |
|---|---|---|---|---|
| 2005/0198645 A1* | 9/2005 | Marr | ................. | G06F 21/10 |
| | | | | 719/310 |
| 2006/0010430 A1* | 1/2006 | Cousot | ................. | G06F 21/16 |
| | | | | 717/127 |
| 2007/0130292 A1* | 6/2007 | Tzruya | ................. | G06Q 30/02 |
| | | | | 709/219 |
| 2007/0277037 A1* | 11/2007 | Langer | ................. | G06F 21/54 |
| | | | | 713/176 |
| 2008/0229429 A1* | 9/2008 | Krig | ................. | G06F 11/08 |
| | | | | 726/27 |
| 2009/0193211 A1* | 7/2009 | Hu | ................. | G06F 21/575 |
| | | | | 711/163 |
| 2009/0307770 A1* | 12/2009 | Harris | ................. | G06F 11/3644 |
| | | | | 726/22 |
| 2010/0275026 A1* | 10/2010 | Mclean | ................. | G06F 21/12 |
| | | | | 713/176 |
| 2013/0074057 A1* | 3/2013 | Gounares | ................. | G06F 8/41 |
| | | | | 717/152 |
| 2015/0128105 A1* | 5/2015 | Sethi | ................. | G06F 8/36 |
| | | | | 717/106 |
| 2015/0142878 A1* | 5/2015 | Hebert | ................. | H04L 67/10 |
| | | | | 709/203 |

OTHER PUBLICATIONS

Kubemetes. Production-Grade Container Orchestration [online]. 2018. Retrieved from <https://kubemetes.io/> on Dec. 19, 2018, 3 pages.

Docker. Docker Engine [online]. 2018. Retrieved from <https://www.docker.com/products/docker-engine> on Dec. 19, 2018, 6 pages.

Kevin Wang, TLDRLegal . Official Blog & Updates [online]. Jul. 21, 2015. Retrieved from <https://tldrlegal.com/blog> on Dec. 19, 2018, 4 pages.

\* cited by examiner

RUNTIME MANAGEMENT OF APPLICATION COMPONENTS

CROSS-REFERENCE TO RELATED APPLICATION

The present disclosure is related to, and claims priority to, U.S. Provisional Patent Application Ser. No. 62/305,257, titled "Application Generation Based on Configurable Elements," which was filed on Mar. 8, 2016, the entirety of which is hereby incorporated by reference into the present disclosure.

BACKGROUND

Writing software is typically a difficult, error-prone, time consuming, and expensive process. For example, a person or other entity seeking to develop a web-based software application may be required to utilize several technologies and software languages to build and deploy the application. Such technologies and languages may include a web server computer, a database server computer, memory management, authentication, security, schemas, deployment techniques, code management, database code, application layer code, web services, operating system services, user interface code, and so forth. Application development typically requires a team of professionals who have an in-depth understanding of these technologies and software languages. A large enterprise may have a large budget to create and maintain applications using an in-house development team or outside contractors. However, a smaller entity or a solo entrepreneur may lack the budget and/or the engineering personnel to design, code, test, and deploy an application that meets the standards of quality and security expected by end-users.

SUMMARY

Implementations of the present disclosure are generally directed to runtime management of application components. Innovative aspects of the subject matter described in this specification can be embodied in methods that includes actions of: during execution of an application, determining a function to be executed as a component of the application; accessing metadata associated with the function, the metadata including at least one term for executing the function; and based at least partly on verifying that the execution of the function complies with the at least one term, executing the function as a nano function.

Implementations can optionally include one or more of the following features: the at least one term includes at least one license term; verifying that the execution of the function complies with the at least one term includes verifying that at least one of a licensed use or a licensed user of the function complies with the at least one license term; the actions further include determining a version of the function to be executed; the actions further include verifying that the version of the function has not been altered and, in response, executing the function as the nano function; verifying that the version of the function has not been altered is based at least partly on a hash of the function at runtime; the function is included in an action type that is a higher-level component of the application in a hierarchical arrangement of application components; executing the function as a nano function includes employing an executing instance of a container that includes the function as a single function and that does not include any other function; the actions further include determining that the instance of the container is currently executing and, in response, employing the currently executing instance of the container to execute the single function; the actions further include determining that the instance of the container is in a container cache and, in response, activating the instance of the container to execute the single function; and/or the actions further include determining that the instance of the container is not currently executing and is not in a container cache and, in response, creating and executing the instance of the container to execute the single function.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide the following technical advantages and/or technical improvements over previously available solutions. Implementations provide an application configuration platform to enable a person or an organization to rapidly develop and deploy reliable, enterprise-scale, multi-layer software applications without the need to employ a team of software developers to write and debug lines of code in a software programming language. A user of the platform (e.g., a configurator) may combine the pre-written functions and/or elements with functions, services, and/or other components available through a marketplace, to configure an application. In some instances, users may add their own custom code functions for use internally and/or for distribution through the marketplace with automated distribution and licensing as described further below. In some implementations, the platform may access a set of pre-written configurable objects to incorporate into an application. Because the platform's configurable pre-written objects may be essentially free of bugs and optimized for performance, the generated application may be developed more rapidly, may be more reliable, and may execute with more optimal performance than an application created using traditional software development methods. Traditionally, an organization may employ a large team of highly skilled software developers for application development, such as computer programmers, database programmers, user interface programmers, application programming interface (API) programmers, website programmers, quality assurance experts, quality control experts, testing experts, and/or other software experts to develop, test and deploy an application. Through use of the platform described herein, an organization may use a smaller team with less expertise to develop and deploy applications faster, with fewer bugs, and with fewer performance problems compared to a larger team that is employing traditional methods and programming languages.

The platform enables a user, also referred to herein as a configurator, to work from a higher level specification instead of exhaustively defining a detailed specification of the application prior to beginning to develop the application. The platform allows the configurator to employ rapid iteration as a design approach, such that the end-user of the application has a relatively earlier view of the application than with a traditional software development approach. Use of the platform also substantially reduces the time required by the code-compile-execute-debug cycle (or a code-execute-debug cycle in instances where an interpreted language is used) employed by programmers using a traditional software development approach.

Accordingly, implementations provide various technical advantages over traditional software development platforms. For example, because implementations reduce the time required to develop an application, and reduce the number of iterations that may be required to debug, optimize, or otherwise refine the operations of the application, implementations provide a platform that consumes less runtime memory, less processing power, and/or less network bandwidth compared to traditional software development platforms that require a longer development cycle with a larger number of revision iterations. Further, because implementations enable a smaller team to create an application compared to the team that may be required to create a similar application using a traditional software development platform, implementations require fewer computer hardware and/or software resources than traditional software development environments.

In addition, because functions are immutable, implementations may use lookup tables to get a function's output instead of running the actual function again. For example, a function may accept input that is an image to be watermarked, and the output of the function may be the image with the watermark. The second time the same binary image file is presented as input to the same function, implementations may return the output watermarked image from its pre-cached storage instead of running the function again. Values stored in a data source instance (e.g., for external and/or internal data sources) may also be cached and used instead of making a call to the data source, if the values have not changed since they were cached. For some data sources (e.g., internal data sources), the cache may be updated in response to a change that is made to the stored data. Caching may also be advantageous at other levels of components that include immutable functions. For example, an action group may include actions which each includes one or more functions. Because the ultimately included functions are immutable, the action group is also effectively immutable, and behaves deterministically in response to particular inputs to the action group. Accordingly, the results of executing an action group in response to particular inputs may be cached and used during subsequent calls to the action group with the same inputs, instead of re-executing the entire action group.

Implementations provide an application development platform that allows a configurator to combine a set of pre-defined objects, actions, and events in any suitable combination (from among a virtually unlimited set of possible combinations), and to any suitable depth, by entering values and selecting options during the configuration of an application. The platform may automatically generate the metadata for an entire application without the configurator ever seeing or writing any code. In some instances, the user (e.g., configurator) can also add custom code functions into the system, for use in their application and/or distribution through the marketplace. This metadata may include all aspects of an application such as design, style, forms, screens, user experience, user interaction, system action, database, fields, field attributes, calculations, dependencies, consumable APIs, get/put/post APIs, application lifecycle management, deployment, releases, server allocation, geo-caching, memory caching at all levels (e.g., database, application, client browser), users, authentication, security, encryption, maintenance, and so forth. In this way, implementations provide an advantage over traditional software development environments. At least some implementations provide another advantage in that specific use cases may not be built into objects, actions and events supported by the platform. Instead, the platform may support objects, actions, and events that are lowest common factors that may be combined to implement a particular use case.

Another advantage of using the platform is that the creation and modification of the associated database(s) of a given application are automatic such that the configurator is able to develop and modify the application without needing to design the database schema or code and debug the associated database software and database queries. In some implementations, the platform automatically builds the metadata that defines one or more of the tables, columns, dependencies, web services, and/or other foundational elements of the application without requiring the configurator to write any code (e.g., source code in a typical programming language). Another advantage of the platform is the configured creation of APIs that the platform stores as metadata without the configurator having to write any code. The platform also enables the configurator to create layers of complex logic and calculations that the platform stores as metadata without requiring the configurator to write any code. Another advantage of the platform is that the configurator is able to specify an application that includes time-based services (e.g., sending an email) that the platform stores as metadata without requiring the configurator to write code for the services. Because of the aforementioned advantages, the platform allows the configurator to create an application, in which the process of creation is at a relatively higher level of abstraction than with traditional computer programming tools. Because the configurator does not have to develop a detailed specification, write and debug lines of code, or design databases and queries, the configurator is free to focus more on process innovation rather than the details of programming.

Moreover, the platform provides another advantage in that configured objects and actions, as well as all logic and database structure and queries have been refined and implemented such that the configured application that is created is already largely debugged and optimized. This may be particularly useful in caching in the database, web server, and client side of the application. Another advantage is that because the configuration of the application, APIs, objects, actions, and so forth is performed in a structured environment, different configurators (e.g., different users of the platform) can more easily modify and extend an application they have never seen before and more easily understand what everything does and how to manipulate it. This allows for turnover within an organization as well as easier handoff of design and application logic. Another advantage of the platform is that a designer can use the platform to create the look and feel of all forms in an application and then a more advanced configurator can work after the designer, or work alongside them in the same environment, to build out the way the application is to operate. This allows for seamless transition through the application lifecycle. Another advantage of the platform is that because the barrier to entry in terms of making modifications is lower than in traditional development environments, many more people can build more complex and useful applications, allowing for cost reduction across the application build by not requiring the same level of expertise. Another advantage of the platform is that metrics on usage of the platform to build an application, as well as usage by the end users of a deployed application are automatically tracked and available for analysis. This reduces or eliminates uncertainty (which may be present in traditional development environments) about how difficult and/or costly an application was to build, and how engaged the end users are. Another advantage of the platform is the single click deployment of an application into a test environment as well as a single click deployment into a production environment and the ability for a configurator to seamlessly move end users between environments.

In some instances, each end-user session can be associated with metadata that describes a particular set of versions and/or packages for use during that particular session and/or for a particular user or set of users. In this way, implementations provide an advantage for iterative testing as well as for AB testing. In this way, in some implementations there may not be multiple environments per se, but instead multiple sets of metadata being interpreted by the same framework execution core. Accordingly, implementations allow for different environments to be exposed to different end-users, where each environment may include a different set of components that may be dynamically swapped in and out during execution. In this way, implementations provide for runtime environments that are more flexible, configurable, and dynamic compared to the traditional distinction of test environment versus production environment. Implementations may eliminate the need for formally defined test and production environments.

Moreover, implementations provide further technical advantages through the execution of functions as containerized nano functions in an environment. By ensuring that functions conform to a pure functional paradigm, implementations ensure that functions within an application behave in a more deterministic fashion compared to traditional applications in which function output may be dependent on a hidden state and/or behavior of the function such as internal calls to other functions. Accordingly, implementations avoid the expenditure of processing, memory, storage, network, and/or other computing resources that traditional systems may expend recovering from runtime errors in applications. Through the execution of functions individually and independently in a containerized nano functions environment, implementations also provide for runtime checking of the versioning and/or licensing of individual functions at runtime. In some instances, some custom functions such as JavaScript functions may not run in a container because they are executed in the browser. Implementations may verify, at runtime, that the version of a function to be executed has not be altered, thus avoiding errors that may occur in traditional systems due to incorrect versioning of application components. Moreover, implementations may verify, at runtime, that the use and/or user of the function complies with various license terms described in metadata packaged with the function, thus avoiding executions that may violate the terms of a license. Through version and license verification at runtime, implementations avoid the expenditure of processing, memory, storage, network, and/or other computing resources that traditional systems may expend recovering from the execution of incorrect versions of application components and/or out-of-license execution of application components. Implementations allow for real-time in-production testing of new or different functions (or other components) for specific users, sessions, and/or groups of users, by allowing functions (or other components) to be "swapped out" by a configurator and then assigned to be rendered and/or executed for some end-users instead of all end-users. Implementations also allow data sources to be cached as if they were input/output functions, including external data sources through web services. For instance, if a request is made to a web service, the response is cached if it is defined to be cached by the configurator. This allows for the request to be handled internally without having to query or request the external data source again. For internal data sources, any change to the data updates this cache automatically so that the database is not actually being requested when the same request is made to it subsequently.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
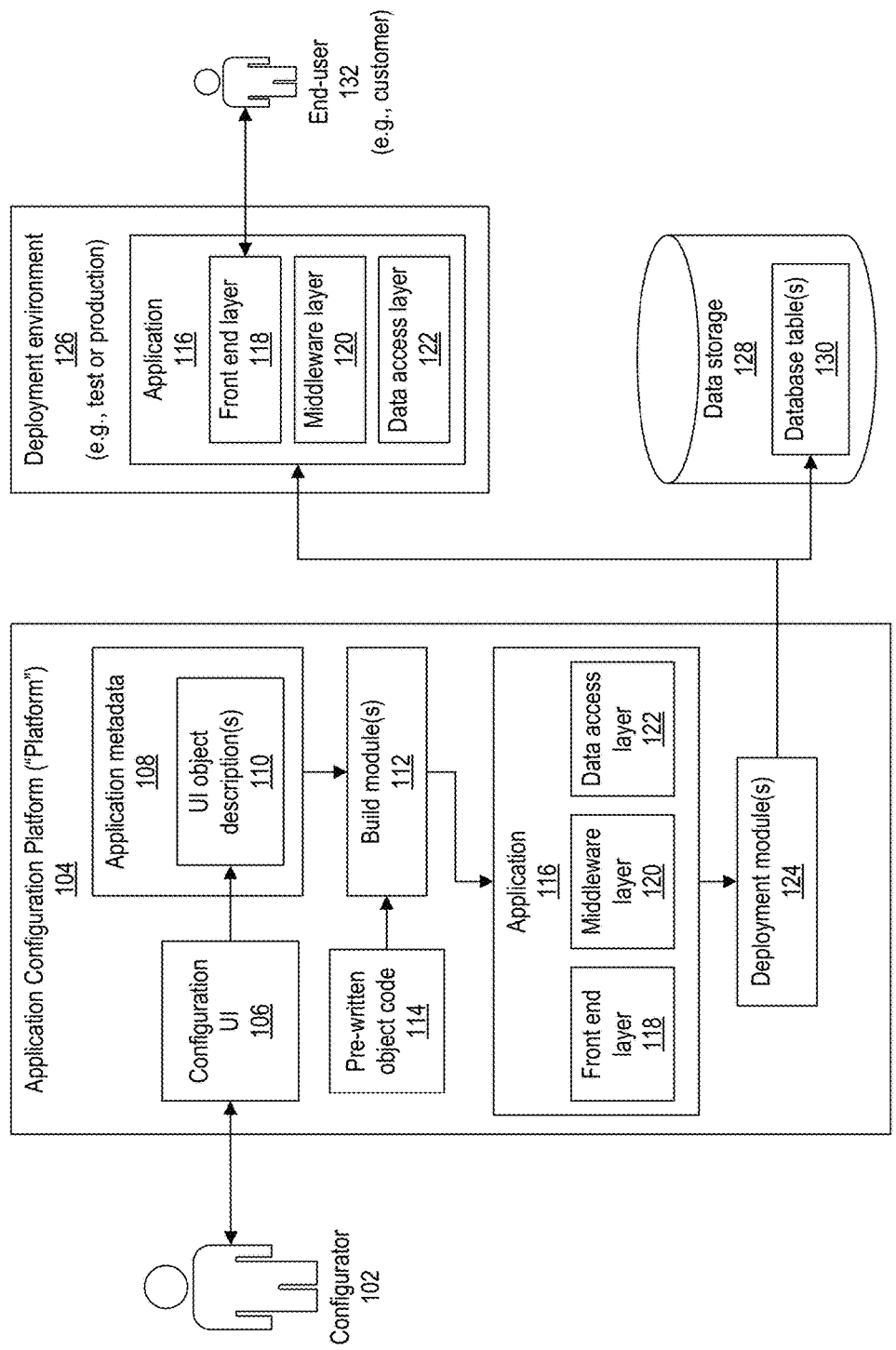
FIG. 1 depicts an example system for generating an application based on configuration elements, according to implementations of the present disclosure.

Implementations of the present disclosure are directed to systems, devices, methods, and computer-readable media for creating web and mobile applications based on the configuration of elements specified by a user through an application configuration platform, also described herein as "the Platform." In some instances, the user may configure an application to include pre-written components, such that the user is not required to write code for the components. In some instances, the Platform may include a code editor that enables a user to write code for components to be used in their own application and/or shared with other users through a marketplace. The Platform includes a configuration user interface (UI) which may be presented on a computing device. A user of the Platform may be described as a configurator. A configurator, such as an application developer, may interact with the configuration UI to specify various UI objects to be included in the front end (e.g., UI) layer of the application, such as forms, controls, or other UI elements to enable an end-user to interact with the application during its execution. The configurator may specify attributes for the UI objects, such as a name of the field to hold data entered through a UI object, a data type for the field, a size for the field, a style for the UI object (e.g., text entry box, button, menu, etc.). The configurator may also specify dependencies between the field and other fields, or other information for the UI object. The specification of the UI object(s) may be stored as application metadata, which may be updated based on subsequent updates to the application configuration made through the configuration UI. Build module(s) of the Platform may access the application metadata and generate code (e.g., source code) for the UI object(s). The Platform may also generate code for middleware object(s), including logic to implement the dependencies between fields. The Platform may also generate code for data access object(s), including logic to access and update the field data stored in column(s) of databases. In some examples, the Platform generates the columns or other data storage elements to store various fields in table(s) of a database or other type of data storage, for each of the fields corresponding to a UI object specified by the configurator in the configuration UI. The application (e.g., executable application) may be built based on the generated code, and may be deployed to a deployment environment such as a test environment or a production environment. In some instances, each deployment environment is based on the current session and/or current user's specific versions of the metadata as interpreted in real time, as described further below.

In some implementations, the Platform does not include a code editor to enable the configurator to write or edit code for the various objects. Instead of the configurator manually writing code, the generation of code for UI objects, middleware objects, and data access objects, as well as generation of the columns for data storage, may be performed automatically based on the configuration elements specified by the configurator in the configuration UI. Accordingly, implementations provide a set of tools to enable an organization to rapidly develop and deploy reliable, enterprise-quality, multi-layer software applications without the need to employ a team of programmers.

As used herein, an application refers to a software application that may be configured and generated using the Platform. A software application may include any suitable number of layers, such as one or more of a front end layer (e.g., user interface), middleware layer (e.g., implementing business logic), or data access layer (e.g., persistence layer) for interfacing with data storage such as a database. The Platform may be employed by a configurator to configure any suitable type of application, including but not limited to an e-commerce application for online shopping or an Enterprise Resource Planning (ERP) system for business management. An application may be configured to execute substantially autonomously, without interacting with other processes or applications. An application may also be configured to operate as an interface, library, service, or other type of software module that interacts and communicates with other processes during execution. Accordingly, the Platform may be employed to configure an application with any suitable degree of complexity as desired by the configurator (e.g., developer). In some examples, the application is a web application configured to execute within a web browser or configured to execute, at least in part, in a container arranged to present web content such as a WebView or UIWebView object.

As used herein, configuration includes the manipulation, by a user of the Platform, of software objects in the Platform. Configuration may include, but is not limited to, insertion, deletion, hiding, showing, placement, labeling, coloring, or otherwise defining aspects of the objects. Configuration may also include setting field values, entering equations or calculations, or other operations on software objects in the Platform to create an application.

As used herein, a configurator refers to a designer, developer, or other user(s) interacting with the configuration UI of the Platform to configure an application. The configuration UI may also be described as a configuration view. An end-user refers to a user of the application executing in a test or production environment. For example, in instances where the application is an ERP system, the end-user may be an employee using the application to create a purchase order.

As used herein, a UI object describes an object added by the configurator to the application in the configuration UI. For example, a UI object may be a form, text entry element, or other UI element to be presented in the front end layer of the application to enable an end-user to enter a value for a field, and/or to enable the application to present the value of a field to an end-user. UI objects and other types of objects, such as middleware objects or data access objects, may include automatically generated code that may not be directly viewable by the configurator. Such code may include HyperText Markup Language (HTML), HTML5, JavaScript, CSS, and/or any other code described using any suitable type of programming language. Implementations support the use of any suitable programming language for object code, including compiled languages, interpreted languages, scripting languages, markup languages, and so forth.

As used herein, an event describes a gesture, input, or other operation that may be performed by an end-user with respect to a UI object. For example, an event may be caused by the end-user selecting a UI object to make it the active UI element, entering text or other data in the UI object, gesturing in the UI object to enter a command to the application, and so forth. As another example, an event may be caused by the end-user and/or the operating system changing the size (e.g., width or height) of a window or other UI container of the application. Different styles of UI objects may have different possible events that may be performed with respect to the UI object. For example, a text entry element may have possible events caused by the end-user clicking in the element (to activate it), performing keystrokes or other inputs to enter text, tabbing or otherwise navigating away from the element, and so forth. The style of the UI object may indicate the type of UI element, such as whether the UI object is a text entry box, button, radio button, drop-down list, menu item, text display element, and so forth. Possible events may be based on the style of the UI object. Events may also include events that are not directly caused by an input of the end-user. For example, events may be caused by activities of the executing application, such as an onLoad event that is performed when the application launches and/or presents a UI. As another example, an event may be caused by the expiration of a timer running in the execution environment, or otherwise based on a clock reaching a particular time. Events may be caused by changes in the execution environment of the application. Events may also be caused by external processes. For example, an event may correspond to the application receiving a communication from another process executing on the same computing device or a different computing device. Moreover, an event may be caused by one or more actions performed by the application, as described below.

As used herein, an action describes an operation that may be automatically performed by the application in response to an event. For example, in response to an event such as closing a dialog, the application may perform an action to send the text that has been entered in the dialog for processing or storage by the other layer(s) of the application. An event may trigger one or more actions performed by the application. In some implementations, the possible actions triggered by an event may be based at least partly on the style of the UI object in which the event occurs.

The Platform allows a configurator to specify UI objects for the front end layer of an application. Based on the UI objects, the Platform may create various portions of the application stack, such as the front end UI, middleware business logic, and back end data access layer, without requiring the configurator to manually write any code. In some implementations, the Platform does not include a code editor and code generation is handled automatically, triggered by the configuration choices made by the configurator in the configuration UI. For example, in response to detecting that the configurator has placed a UI object for a field C onto a form for the application front end, the Platform may generate one or more of the following:

A HTML element for the field C;

A column in a database, or other data storage structure, to store data for the field C, with the data type, size, or other attributes specified by the configurator;

A corresponding field in a JavaScript Object Notation (JSON) file or other format file, if the application is to use JSON or some other format for handling data;

JavaScript code, or other code, that creates the request from the application UI to a web server, specifying the input value of the field C, or other fields on which field C depends;

Data access object(s), including logic to access or update the column (or other type of data storage element) for field C in a database, such as logic expressed using any appropriate version of structured query language (SQL), active server pages (ASP), and/or ASP.NET;

Middleware object(s), such as dependency logic in an application layer or business logic layer of the application, if logic is used to populate the added field C. For example, if the field C depends on A and B (e.g., A+B=C), the Platform may generate middleware code (e.g., in SQL, ASP.NET, etc.) to calculate C based on A and B; or Other UI object(s) including logic for handling dependencies between fields in output presented through the front end of the application. For example, if field D depends on C, the Platform may automatically generate code to calculate and populate the field D based on the value of C.

In some implementations, the Platform may not generate the code itself at configuration time, but may instead generate metadata that describes the code, for example, in the case of JavaScript code and data access object(s). The metadata for an application and/or its various components may be generated at configuration time based on the selections of the configurator to configure the application, and such metadata may indicate how all the various components of the application work together in the configured application. The code for the various components may have been previously written. In some instances, the code for component(s) may be hosted on other (e.g., third party) systems and may be incorporated into an application that is being configured using the Platform, and such incorporation may include generating metadata associated with the externally hosted code, where such metadata enables the external components to be incorporated into an application in the Platform.

In general, a function may be written to perform a particular purpose. The metadata associated with the function may define input arguments, output arguments, and/or other aspects such as whether a library is needed to execute the function, or other dependencies. The metadata may be described as an API around a code function. The coder may define the metadata for a function. The metadata associated with a function may enable the function to be incorporated into any number of applications configured through the Platform, regardless of the source code language used to create the function. In some implementations, a function or other component may be associated with a first set of metadata that describes aspects such as input arguments, output arguments, and so forth, e.g., aspects that apply to the component regardless of how it is being used in an application. A second set of metadata may be generated when the configurator decides to add the component to an application at configuration time, and the second set of metadata may describe how the component interacts with other components in the application.

For example, a watermark function may accept inputs for the image to be watermarked and the watermark to be applied, and may output the watermarked image. The function may be included in an element that may be added to an application during its configuration. When the element is dragged and dropped into the application through the design UI, the element is added to the application. This may also create an instance of the function that is included in the element, as well as the second set of metadata indicating how the function works within the application. The second set of metadata may include source locations for the watermark and the image, to be used as input arguments to the function at runtime.

When a page loads for an application to be presented to an end-user, a location (e.g., a DNS-resolved URL) is determined for the application. The application has metadata that indicates characteristics of the application, such as whether user authentication is needed, what form is to be displayed initially, and so forth. The metadata for an application may also include pointers to the various forms that are components of the application. Each form may be associated with metadata that describe the various form elements and/or action groups included in the form. Thus, a component at each level may have dependencies that are components at lower levels, and each of those lower level components may itself have lower level dependencies, and so on, with metadata at every level describing the associated component(s) at that level, down to the function level. On loading an application, the execution core may access the metadata at each level of the application and render the page(s) of the application accordingly. Code is then generated in the client web application, such as JavaScript, CSS, and/or HTML code, based on the metadata for the application. Thus, a second set of metadata may be generated for the application at configuration time and that metadata, along with the first set of metadata previously associated with the various components, may be used to generate code for the application at runtime.

The Platform may also generate other types of code to implement any layer of the application according to the configuration choices made by the configurator.

The Platform may hide all the underlying object code from the configurator, so that the configurator only needs to add a UI object for a field and specify the dependency logic for the field. In some examples, the Platform may enable the configurator to select a filter set to specify dependencies between values of fields. In some implementations, the configurator may specify a filter set to indicate dependencies between fields. In some examples, a filter set may depend on one or more fields specified in other filter sets, and so forth, to create a chain of dependency of any suitable length. If a filter set of data is dependent on field(s) of other filter set(s) in a dependency chain, the dependencies may also be affected. This can affect data in fields presented in the UI (e.g., front end) of the application, and may also affect displays of row data in table views in the data storage layer, and/or affect dependencies that perform action(s) based on certain criteria being satisfied. In some implementations, application logic is generated automatically by the Platform for the middleware or data storage layers, as well as the front end layer, by queuing and calling actions based on the dependency changes. When a field is modified, and that field is used to filter in a filter set, and another object is dependent on that filter set, the object may be updated as needed. For example, the field value may be recalculated in the middleware layer and then sent to the front end layer in a response.

In some implementations, the Platform also automatically generates code to handle data caching in the executing application, stored procedures to be used for data access operations, indexing a database, memory management, or other aspects of the front end layer, the middleware layer, or the data storage layer of the application. In some implementations, the Platform may generate metadata that the core uses to handle these aspects.

Any changes made to the application configuration in the configuration UI may be propagated throughout the generated metadata. For example, if a configurator changes a field in a form in the front end of the application, that change may trigger automatic changes in the database columns, business logic, dependency filter sets, or anywhere else that is impacted by the change to the previous configuration of the application. Accordingly, the Platform enables a configurator to experiment with different configuration choices, and the Platform incrementally changes the generated metadata for the application based on the configurator's alterations.

In some implementations, the application code produced by the Platform is optimized at the object level, and at the level of interactions between objects and between layers. Accordingly, the software generated by the Platform may perform better, and exhibit fewer bugs, than software written in the traditional manner through coding in a traditional integrated development environment (IDE). For example, the generated JavaScript may be minimized, and requests and responses may also be minimized for optimal performance. The generated application may also be optimized for security, data privacy, or other considerations.

The Platform also handles versioning and release cycles automatically, for releasing to a test environment or a production environment. For example, the Platform includes features that enable a configurator to revert to a previous release (e.g., previous version or revision) of an application, if a current release is found to have a problem. In some implementations, the Platform enables the hot release of a new version of an application while end-users are currently accessing a previous version. In such instances, the Platform may force a clearing of cached data, or take other actions to facilitate the hot release of the new version of the application.

FIG. 1 depicts an example system for generating an application 116 based on configuration elements specified by a configurator 102 through the Platform 104, according to implementations of the present disclosure. In some implementations, the Platform 104 may execute as software on one or more computing devices of any suitable type. As described above, a configurator 102 may interact with the Platform 104 through a configuration UI 106 to specify the various end-user facing elements of the application 116. Although examples herein may describe a single configurator 102 using the Platform to configure an application 116, the Platform also enables a team of configurators 102 to collaboratively configure the application 116.

Starting from an empty form (e.g., a blank canvas), or from a template, presented by the configuration UI 106, a configurator 102 may draw a container onto the form. The container may correspond to a div in a web UI. The configurator 102 may specify any suitable number of UI objects to put into the container. The configurator 102 may specify a style for the various UI objects. For example, the configurator may style a UI object as a tab control (e.g., style=button-tab). The dimensions (e.g., height, width, etc.) and position (e.g., float, absolute (x, y, z-depth), relative to a position or to another object on the form) of the UI object(s) may also be specified by the configurator 102 in the configuration UI 106. The configurator 102 may also specify other attributes for the UI object(s), based on the style of the UI object. For example, a text input style UI object may include attributes for text font, font size, color, padding, alignment, and so forth. In some implementations, the Platform provides for templating in which a set of functions enable one or more UI elements, events, actions, filtersets, database tables (which may also be described as data sources), and/or APIs to be combined into a template or plugin that can be re-used elsewhere in the same application, and/or can be used in a new application configured by a same or different configurator. Implementations provide for a template that may encompass a whole application or any appropriate subset of an application. Once generated, a template can be modified as needed for a new purpose in the same or different application.

A UI object of a particular style may have a certain set of events associated with it, corresponding to the events that an end-user 132 can perform with respect to the UI object. For example, an onclick event in a text entry field may place the cursor in the field for text entry, a keystroke event may add text data into the field or could call any action defined in the application, and so forth. A keystroke event may include any suitable combination of keys that is not overridden by the operating system (OS) of the computing device(s) where the application 116 is to execute.

Based on the style of a UI object, as indicated by the configurator 102, the Platform 104 may determine a set of possible events that may occur with respect to that UI object. The Platform 104 may present, in the configuration UI 106, a selectable list of events. The configurator 102 may select one or more events to be handled by the application 116 with respect to the UI object. The configuration UI 106 may also enable the configurator 102 to select one or more actions to be performed by the application 116 in response to each handled event. An event can be mapped to an action to specify that the action is to be performed in response to the event. The available actions may be predefined within the Platform 104, and the configurator 102 may specify in the configuration UI 106 that particular action(s) are to be performed in response to a particular event. Actions may also be conditional based on the values of other data field(s) in the application, based on other data in filtersets, based on system variables such as current date/time, operating system, browser, etc., or based on the display of UI elements on the form. Actions may include calls out to other web-based services to retrieve data from those services. In some implementations, the Platform 104 may enable the configurator 102 to specify that multiple actions are to be performed in response to an event. In such cases, the configuration UI 106 may enable the configurator 102 to specify an order of the multiple actions, and whether actions are to be performed serially and/or in parallel. The configuration UI 106 may also enable the configurator 102 to specify a time delay between particular actions.

The queuing order of an action group may be set by the configurator 102 when the configurator 102 specifies the action group by placing the actions in an order and specifying a "wait" parameter (e.g., for a number of milliseconds, or until the previous action has completed) or a "don't wait" parameter. The queuing of multiple action groups that are called in the application 116 by multiple user events taking place simultaneously, and the queuing of additional action groups that are called from within another action group that was called by a user event, may be handled automatically by the Platform 104. Action groups can be nested to any suitable depth and conditional logic within an action group can create partial loops which exit once certain criteria are met. Thus, the Platform 104 supports essentially any level of complexity for executing multiple actions within (e.g., nested) action groups, and based on conditional logic for field values, filter sets, and events that can be triggered by one or both of the end-user or listeners that monitor for field value changes, window width, and so forth. Table 1 below lists an example set of actions, object size and/or positioning, object styling, objects, system assets, fields, field properties, and user events that may be supported, in whole or in part, by various implementations. In some instances, third parties may be able to create any or all of these and make them available for use in the platform, e.g., through a marketplace.

TABLE 1

| Name | Description | May be used with | Example use case |
|---|---|---|---|
| Begin ACTIONS | | | |
| Action Groups | An Action Group is a group of actions set in an order that run concurrently or one after the other based on "wait"/ "don't wait" settings between each action. If the action is set to "wait", then configurator may enter a number of milliseconds or seconds to wait, or set it to execute immediately after the previous action finishes. Action Groups can be nested within other Action Groups. Circular references may not be allowed, and the configurator may drag and drop to re-order the actions in the group. | Any other action(s) | Any series of action(s) |
| Activate Layer | In a container with layers, this action may activate the layer selected in the action properties. | New Record, Open Record | When creating a new record or opening an existing record, set it to load into a layer and then use the Activate Layer action to make that layer visible |
| Alert | Opens a browser alert with text entered in the properties | Conditional Filterset, Conditional Switch | When a conditional action is used to check one or more values in fields on a form, and those values are incorrect, use the alert action to notify the user to fix the values |
| Assign Action to User Event for Object | Select an object on the form, a user event for the object, and another action on the form. When this is called, it may change the selected object to have the event and action configurator has set. | | Based on a value entered by the end user, switch the functionality of objects on the page. |
| Auto-Size Textbox Font | Resizes the text inside of a textbox to make it fill the entire text box area | Insert Text into Text Box | For responsive design, make a text box a percentage of the width of a container. When the width of the page changes, call the auto-size action so that the size of the text changes to match the new size of the text box |

TABLE 1-continued

| Name | Description | May be used with | Example use case |
|---|---|---|---|
| Auto-Save Field | This action automatically saves the field it is selected for on the event it is set for. | Fields | When a user modifies a field, this action may automatically save their changes. |
| Calculate Fields | Forces a re-calculation (numerical or auto-fill) of one or more fields on a form, or one or more columns in a filter-set of records | Get Values | After adding a line item to an invoice, call this action to re-calculate the total on the invoice. |
| Calculate Composite Field Values | Inside of each field object, there is an option to use other field values to concatenate the string of the value in the field. So for instance, the field value could be "some text [another field] some more text". If the value of "another field" was "123456", then the value of the field being composited would be "some text 123456 some more text" | Text Fields | In the body or subject of an email, reference contextual values on a form such as a customer's name |
| Calculate Composite Text Values | Inside of each "text box" object, there is an option to use other field values to concatenate the string of the value in the text box. So for instance, the text box value could be "some text [another field] some more text". If the value of "another field" was "123456", then the value of the text box being composited would be "some text 123456 some more text" | Text Boxes, Fields | Put a "Title" text box at the top of a form so that the value in the text box concatenates from important contextual values on the form such as an Order ID, or a Customer Name. |
| Call Action on External Records | May call an action on a filterset of records on a form that is currently open somewhere in the user interface. | Form Rows All other actions | Call an action group on a set of records in a filterset (or on a single record) to update something on the open form. For instance, when a purchase order is marked as ordered, change the "Purchasing Status" on the Customer Order to "Ordered" without having the web application need to request the new data from the database. |
| Change Position | Moves an absolute positioned object to a different position | | OnMouseIn, move the object to a different position |
| Change Size | Changes the height and/or width of an object or container. Can be changed to pixels, percentage, calc, or auto | | Allow the user to enter the width of an image and corresponding text box for an internal bulletin |
| Change Style | Changes an objects style to a different style | Enable/ Disable Object | Have a field on a form that defaults to being un-editable and in a style that either looks disabled, or just looks like a text label, and have an "edit" button next to it. When the edit button is clicked, make the field editable, and also change the style to a normal field. |
| Clear Fields | Clears the value out of one or more fields on a form | Clear Filters Refresh Table View | Add a "reset" button at the top of a table view. When clicked, clear the search field and also the filters and then refresh the table view. |
| Clear Filters | Clears the values out of all the filter cells of a table view | Clear Fields Refresh Table View | Add a "reset" button at the top of a table view. When clicked, clear the search field and also the filters and then refresh the table view. |
| Close Form | Closes a form that is currently open in a container, tab or window. (may close | | When a form is opened into an external area, like |

TABLE 1-continued

| Name | Description | May be used with | Example use case |
|---|---|---|---|
| | the tab or window if the form is in a tab or window) | | a browser tab, and configurator may add a "close" or "back" button that closes the tab. |
| Conditional Logic - Filterset | Create conditional logic based on comparing filterset column values to static values, filterset column values to field values on the form, or to compare filterset column values to other filterset column values. Use multiple comparisons with "ANY" or "ALL" needing to be true. Select an action group to call when the condition results in true and another when it results in false. | | Check to see if the customer name entered already exists and then open a warning and make the user either change the name, or re-direct them to the other customer record. |
| Conditional Logic - Values | Create conditional logic based on comparing field values to static values, field values to other field values, or the current browser being used. Use multiple comparisons with "ANY" or "ALL" needing to be true. Select an action group to call when the condition results in true and another when it results in false. | All other actions | When a field value on the form does not match one or more static values, disable a set of fields on the form. |
| Conditional Logic - Object Display | Create conditional logic based on whether or not a specific object on the form is currently being displayed. Use multiple comparisons with "ANY" or "ALL" needing to be true. Select an action group to call when the condition results in true and another when it results in false. | All other actions | Check to see if a menu is hidden or not and then change the style of a button to represent this visually. |
| Conditional Logic - Switch | Select a set of fields and a value for each field. For each of these, select an action for when the expression is true and another for when it is false. Configurator can also select a filterset and column instead of a field on the form. When called, all of these conditions may be checked and the appropriate actions run. | All other actions | Used in similar ways to the other Conditional Logic actions, it just makes it more efficient to create a lot of related logic on a form. |
| Create Token for Record/ Form | Creates a unique token associated with the form set in the action properties for the record that is open when the action is called. To be used, the token is called as part of a URL. When this URL is entered into a browser, the record that the token was generated on may be opened using the form selected by the user without needing to authenticate (login). | Insert Text into Field Open URL | For a particular transaction (Invoice, Purchase Order, etc.), a unique token value is created when the record is created. This unique token may be inserted into a field and then concatenated with the domain name and code version to produce a link. The link may then be emailed to a customer/vendor so that the customer/vendor can view their transaction without needing to authenticate (login). |
| Delete Records | Deletes a set of records out of a filterset. Select a table view in the action and then the delete may delete only the records in the table view. If the table view has the option for "Local Checkbox", then the action may only delete the records that are checked by the user. | Refresh Table View, Refresh Form Rows | Allow a user to delete one or more records from a table of data and then refresh a table view to show the new results after the records have been deleted. |
| Duplicate Records | Duplicates a set of records into a new set of records. Use the mapping to take values from the records being duplicated, from fields on the form that the action is being called from, or to insert static values into the new records being created. | Refresh Table View, Refresh Form Rows | Have a default set of items for a transaction that get duplicated and associated to each new transaction that is created. |
| Email From Form Values | Map a set of fields on a form to the action to create an email | | Send an email to someone |

TABLE 1-continued

| Name | Description | May be used with | Example use case |
|---|---|---|---|
| Empty Container | Empties all of the objects in a container | | Clear out a container (div) before loading a different set of content into it. |
| Enable/ Disable Object | Enables or disables an end user's ability to interact with an object | Change Style Conditional Action | Make a field or button on a form unusable based on a field value on the form. |
| Enable/ Disable Scroll | Enables or disables the scroll bar in a container | Walkthrough Object Fixed Container Object | Disable the scroll on a background container while the user is in a walkthrough or a lightbox is open. |
| Export Filterset to .CSV | Exports a filterset of records to a .CSV file | Filtersets | Allow an end user to export a set of data from a filterset |
| Export Tableview to .CSV | Exports a Table View of records to a .CSV file | Table View Object Hide/ Show Table View Columns | Allow an end user to search, filter, hide/show columns, and sort a table view, and then export the results. |
| Get Values | Select a set of fields from the form, then when called, this action may get the current values out of the database and return them to the form. | | Allow the end user to call out to a third party application that interacts with the application 116 using an API. Upon returning to application 116, call this action to go get the new values that were created by the user interacting with the third party application. |
| Hide/ Show Objects | Hide objects, show objects, or toggle objects between hidden and shown on a form. | | On a transaction, have a menu field for "Type", based on the option selected, hide and show other objects (fields, containers, etc.) so that the form is contextual to the type selected in the menu. |
| Hide/ Show Table View Columns | Allows an end user to view a list of other available columns to show/hide in a table view being displayed on a form. | Table View Object Export TableView to .CSV | On a list of Invoices, show a default set of the most commonly used columns, but allow the userto unhide other columns that have been defined to have access to the other columns. |
| Home Page Action | Call an action that is on the Home Page. The Home Page | All other actions | Put a button inside of a transaction form that opens a slide-out menu in the home page |
| Import Records from .CSV | Allow an end user to import a set of data into a group by selecting the group, one or more columns to import into, and one or more columns for matching. When the action is called, the end user may map their csv columns to the columns set in the action. When the import is run, three types of data may be displayed for verification by the end user.<br>1. New Records - rows in the .CSV file that did not match any existing records in the group.<br>2. Record Modifications - rows where the columns defined for Match found matches<br>3. Records with Issues in Validation - rows where the data in the file is improperly formatted, such as a text value in a number column.<br>The end user can check individual | | Allow the end user to import a list of customers. |

TABLE 1-continued

| Name | Description | May be used with | Example use case |
|---|---|---|---|
| | boxes to import only certain record, or they can "check all" and import all the new records and record modifications. The end user can export to a csv file, the records that had validation issues | | |
| Insert from Filterset | Insert one or more field values from the top row of a filterset into one or more fields on a form. | | Allow a user to hide/show columns, resort, and filter a table view and save these preferences with their user record. Then, next time the user comes to the same table view, retrieve the values from their User record using the Insert from Filterset action. |
| Insert Text into Field | Insert either static values or values from one or more fields into one or more other fields on the same form. | | Add a button called "same as billing" that copies the values from the Billing Address on a form into the Shipping Address fields on the form. |
| Insert Text into Text Box | Insert either static values or values from one or more fields on a form into one or more text boxes on the same form. | | Insert the Customer's name into a "title" position on a form when the form loads. |
| Mass Change a Filterset Records | Perform a change to a filterset or table view to one or more columns of data within that filterset or table view. The change can either be a static value or a value from a field on the form. | | Have a button called "deactivate all" at the top of a table view that changes that changes the value of a checkbox column called "Active" from Trues to False. |
| Mass Calculate a Filterset Records | Change a number column in a filterset by adding, subtracting, dividing, or multiplying the value by a value in a field on the form. | | Allow the end user to enter a fixed dollar amount to add to a set of product's prices. |
| New Record | When called, creates a new record into a specified group. The fields in the new record can be populated by entering static values, using the current date/time, by selecting a field from the form where the action is executed, or by selecting a filterset column to get a value from. The configurator may also define where to open the new record, in a container, a new browser tab, new browser window, in a container in a homepage, or don't open the new record at all. If opening into a new window, set the height and width of the window. Also, select an action that occurs when the new record is loaded into the area defined. | | Create a new customer by clicking on a button from the home page. |
| Oauth2 Authentication | Creates the initial authentication request for authenticating into a third party API | | In the initial setup process of integrating with any Oauth or Oauth2 the user may go out to the third party and enter their credentials to initiate the integration. |
| Open User Form Creation Area | Opens the user form creation area for a specific group of a specific type | | Allow the end user to create their own forms for displaying the data created in the system, such as creating one or more invoice forms with varying degrees of detail. |
| Open Form | Opens a specific internally created form or User created form for the current record. Specify where to open the form, into a container, a new browser tab, a new browser window, or replace the current browser tab/window. If it is opening into a new | | On an Installation Work Order, allow the end user to click a button that opens an alternate view of the work order for view by the installer through an Installer |

TABLE 1-continued

| Name | Description | May be used with | Example use case |
|---|---|---|---|
| | browser window, specify the height and width of the new window. | | Portal into the system. |
| Open Record | Opens a record that an end user clicks on in a table view. Select a group, a form, and where to open the form (container, new browser window, new browser tab, or home page container). If in a new browser window, set the height and width of the new window. Also select an action to run when the form loads. Also map one or more fields on the record being opened to come from either static values entered in the action, or from fields on the form that the action was executed from. | Table View Object Hide/ Show Objects Action | Allow the end user to click on a customer row in a table view and open the customer form into a lightbox for editing. |
| Open URL | Opens a URL either manually entered in the action, or dynamically from a field value. The URL can be opened into a container, new browser tab, new browser window, or into a homepage container. If the URL is opened into a new browser window, then set the height and width of the new window. | | Open a Supplier's open portal to place an order by tying the action the a field on the form called "Online Ordering Portal Address". |
| Open iOS Scan App | Opens a scanning iOS application and passes filterset, column, and action data to the application. After scanning either a barcode or QR code, the native-app returns a value to the web-app with the original parameters and also the value from the scan. Once complete, the native-app redirects to the web-app and runs the action defined in the action. | QR Code Object | The end user scans a barcode on a printed label that was created on a user form. The barcode is scanned on an iPad in a retail store showroom from within a transaction. After scanning, the product is added to the order. |
| Parse and Split Text Value | Takes a value in a field and parses it based on an action defined delimiter into one or more fields on a form. | | When a value in a QR-code is scanned, sometimes it may contain multiple values separated by commas or another delimiter. After the scan, parse this value into pieces and then use the individual values to filter a filterset of data to find a result. |
| Parse Text File | This action allows for the user to select a path and enter a file name or select a field to get a path and a file name from. Then, then file may be parsed based on values entered in the action with a certain number of characters returned before and after the parsed value is found. | | Find a set of "Bates" numbers in a legal document based on the configuration settings |
| Process Image File | Using an "OCR" processor on the server or through a third party service, take any image and get a response of string values that describe the image either in regular english language describing the image, or through character recognition of words inside of the image. | | Pass a legal document PDF through this action and it may return the file optimized and indexed for searching the text, even though the original PDF was only an image. Or, send a picture to an API where the picture may be processed, such as a picture of two people on a kayak may return a string such as "a man and a woman on a kayak in a river", or possibly additional text such as "rapids", "Whitewater", etc. |
| Previous/ Next Layer | Moves forward or backward between a set of layers. Select a transition effect to move from one layer to the next. | Timer action | Every two seconds, switch moved forward through a set of layers with a slide transition to create a traditional web site home page "Slider". |

TABLE 1-continued

| Name | Description | May be used with | Example use case |
| --- | --- | --- | --- |
| Print Container to PDF | Select a certain container on the current form to print to a PDF. | Hide/Show Objects | Allow a user to send a portion of the UI into a PDF for saving or printing. |
| Print Page | Prints the current window to the browser's built-in print function | Hide/Show Objects | Allow a user to print the entire window of information. |
| Print Iframe Contents | Prints the webpage inside of an iFrame that has been loaded into a div | Open URL Action | Allows a user to print only the contents of a particular iFrame instead of the entire form |
| Print Current Form | Prints the current form that the action is called from | | Calls the browser's "Print" function and writes the current HTML to the printer. Some processing occurs for complex objects such as table views and calendars. |
| Redo | When called, performs a "Redo" of the last text that the user changed with an "Undo" action. | Undo | Combined with "Undo", allows an end user to undo and redo text they've been entering by clicking a button. |
| Refresh Calendar | Refreshes the currently displayed data on a calendar. | Table Views Filtersets | Add a "Refresh" button on a form that contains a calendar to allow the user to manually refresh the events being displayed. Or allow the user to filter a set of records that are used for the events on the calendar and then call the refresh calendar action automatically after they have entered their filters. |
| Refresh Chart | Refreshes the currently displayed data on a chart. | Table Views Filtersets | Add a "Refresh" button on a form that contains a chart to allow the user to manually refresh the data being displayed in the chart. Or allow the user to filter a set of records that are used for the data on the chart and then call the refresh chart action automatically after they have entered their filters. |
| Refresh Form Rows | Refreshes the currently displayed data in a Form Rows object. | Form Rows | Add a "Refresh" button on a form that contains a Form Rows to allow the user to manually refresh the records being displayed in the Form Rows. Or allow the user to filter a set of records that are used for the data of the Form Rows and then call the refresh Form Rows action automatically after they have entered their filters. |
| Refresh Media Viewer | Refreshes the currently displayed files in a Media Viewer object. | Media Viewer | |
| Refresh Table View | Refreshes the currently displayed records in a Table View object. | Table View | Add a "Refresh" button on a form that contains a Table View to allow the user to manually refresh the records being displayed in the Table View. Or allow the user to filter a set of records that are used for the data of the Table View and |

TABLE 1-continued

| Name | Description | May be used with | Example use case |
|---|---|---|---|
| | | | then call the refresh Table View action automatically after they have entered their filters. |
| Remove Special Characters | Removes the special characters from defined fields on a form. Enter exceptions so that certain special characters may not be removed. | Fields | In certain API scenarios and for some data storage needs, special characters cannot be allowed. This action is generally used in a chain of other actions to provide proper data going out. |
| Run Actions on a Filterset of Records | Select a Filterset, select a Form and an Action Group from the Form. When called, this action may run the Action Group Selected for each record in the Filterset. | | Allow an end user to run any type of batch process on a set of records, such as a series of logic on each record that then sends the record to an appropriate API based on the condition's evaluation. |
| Save Fields | Saves the current values in a selected set of fields on a form. This action automatically knows which fields have been modified since the form loads and may only send requests for those fields even if more fields have been selected. When user modifies a field, and more than just a save is to happen, the Save Fields action may be used in an action group with other actions to do something more. | Fields Any Other Actions | When the end user modifies a Customer's Name, save the field value to the database with this action, and then send the new information to a third party using an API Action. |
| Schedule emails from filterset | Map a filterset column by column to create emails. Set the beginning of the service as well as the interval that it may run. From then on, the service may run at the interval set. Each time it runs, the filterset may find records, each of these records may then be sent as an email. | | Allow the user to create alerts that send at a certain date/time in the future (could be based on a number of days or hours before or after another date/time). For instance, a reminder on an appointment. |
| Scroll to a Position in a Container | Scrolls the user's view to a particular x,y position within a container, or to a particular object in that container, | | On a webpage, allow the user to click a button to scroll them down to another section on the same page or within an area of the page. |
| Set Background Color | Set the background color of an object to either a static color, or to a color value in a selected field. The color can be in English such as "Red" or "Blue", or it can be in Hex color codes. | | Allow an end user to select a color in a color field and then use that color to set the background of a container to the color selected by the end user. |
| Set Background Image | Set the background of an object to either an external public URL of an image, or to a file on the server. This value can be entered static inside the action, or configurator can select a field on the form to get the path value from. | | Allow the end user to enter a path or upload a profile picture for their account. |
| Set Background with QR Code | Set the background of an object to display a QR code. Configurator can either enter a static value to create the QR Code, or configurator can select a field on the form to get the value from. | | Allow the end user to enter a value into field and then on change of this field call the action to display a QR Code of the value in div on the form. |
| Set Browser Tab Icon | Set the .ico file with an image either from an external public URL, or from a file on the server. | | Usually the end user doesn't do anything to make this happen, it is just what gets displayed in the browser tab. However, could allow the user to enter their own with this action. |

TABLE 1-continued

| Name | Description | May be used with | Example use case |
|---|---|---|---|
| Set Focus | Sets the focus of the cursor into a specified field on the form. | | When an end user clicks to open a "search" area, the cursor may be defaulted into the search field. |
| Set/ Remove User Modified Flag | In calculation, date calculation, or in any field that is auto-filled with a value by the system, configurator can set an option for "allow user edit". If this option is set, then the user can override the system generated value with their own value. When this happens, a flag is set on that field for that record so that if the system attempts to re-calculate the value, then the value may not be overridden. The Set/Remove User Modified Flag action allows configurator to manually set or unset this flag on a filterset of records or on the current record. | Calculate Fields | Allow an end user in an ERP system to have a function to mass updates a set of product prices based on a percentage increase. Use this action to manually set all of these fields as if they were manually modified by the user so that they may not get re-calculated. Configurator could also provide a function to "restore defaults". For this, configurator may first need to clear the flag on all of the records for that field, and then use the "Calc" action to recall the values to the system calculated values. |
| Sign Out | Signs the user out of their current session. | | Allow an end user to manually sign themselves out |
| Stop Timer | If an endless timer is running, this action may stop it. User may need to select a timer action on the current form. | Timer | In a "Slider" on a website homepage, if there is an endless timer that switches the slide out every 10 seconds, configurator can give the end user a "pause" button that stops the timer. Combine this with a "Play" button that restarts the 10 second endless timer action to start the slider auto-moving again. |
| Table View Grouping - Open Settings | Opens the settings area for a table view's Grouping settings | Table Views | Allows the user to "Group" a report table view by a specific column. If the column is a text column, then one row (Parent Row) may be displayed per unique value in the column. If the user clicks on one of these rows, then the individual rows (Child Rows) may expand underneath. Any number and calculation columns that are being displayed may show a sum and an average in their respective cell in the "Parent Row". For "Number" columns selected to group by, the user may need to enter the numerical ranges that create each unique row. For "Date" columns selected to group by, the user may need to select either "Daily, Weekly, Monthly, Quarterly, or Yearly". The user can select up to three groupings (one main and two sub groupings). |

TABLE 1-continued

| Name | Description | May be used with | Example use case |
|---|---|---|---|
| Table View Related Date - Open Settings | Opens the settings area for a table view's Related Data settings | Table Views | Associate Related Data Source - Allow the user on a report to select another set of data to be included in the current report. They may select from a menu of available Related Data Sources. They may then "map" a column from the first set of data to a column in the second set of data, such as Product ID. Next, the user may select one or more columns from the Related Data Source that may sum into a cell for each row in the Main Report. For "Number" columns selected, the user may need to enter the numerical ranges that create each column in the report, they may also select an additional column that is the totaled number in each cell. For "Date" columns selected to group by, the user may need to select either "Daily, Weekly, Monthly, Quarterly, or Yearly". They may also select an additional column that is the totaled number in each cell. |
| Timer | Select an interval in seconds or minutes, set a number of times to repeat (or set to endless), and choose an action. When this action is called, it may wait the specified time, then call the action specified, then may wait the specified time again, and then call the action again. This may repeat however many times specified by configurator, or repeat endlessly. | Stop Timer | Create a "Slider" on a page that rotates through he slides automatically at an interval. |
| Undo | When called, performs an "Undo" of the last text that the user last changed. | | Combined with "Redo", allows an end user to undo and redo text they've been entering by clicking a button. |
| Upload Files | Enter a file path on the server, or select a field to get the path from, or combine a static value with a field as part of the path (such as using the unique number of a transaction as part of the path). When called, the user may upload a file from their computer and it may be placed into the folder specified. If the folder does not yet exist, it may be created. User can also set the file name to stay the same as the file uploaded, or user can have the action modify the filename based on a static value, or based on a field value on the form. | | Allow the end user to upload a profile picture of themselves. |
| End ACTIONS Begin Object Size and/or Positioning | | | |
| Width | Set the default width of an object in px, pt, %, calc, vw, vh, vmin, vmax, or auto | | |
| Min Width | Set the minimum width of an object in px, pt, %, calc, vw, vh, vmin, vmax, or auto | | |

TABLE 1-continued

| Name | Description | May be used with | Example use case |
|---|---|---|---|
| Max Width | Set the maximum width of an object in px, pt, %, calc, vw, vh, vmin, vmax, or auto | | |
| Height | Set the default height of an object in px, pt, %, calc, vw, vh, vmin, vmax, or auto | | |
| Min Height | Set the minimum height of an object in px, pt, %, calc, vw, vh, vmin, vmax, or auto | | |
| Max Height | Set the maximum height of an object in px, pt, %, calc, vw, vh, vmin, vmax, or auto | | |
| Horizontal Scroll | In a container with absolute positioned objects inside, when the height or width of the container is variable, this setting may allow a scroll bar to appear when necessary to allow the user to scroll to the additional content. | | |
| Vertical Scroll | In a container with absolute positioned objects inside, when the height or width of the container is variable, this setting may allow a scroll bar to appear when necessary to allow the user to scroll to the additional content. | | |
| Rotate | Rotates any object by a number of degrees | | |
| Position Method | "Floating" positions of Left and Right, as well as "Centered" which is actually "Float: none". A fourth option in this toggle is "Absolute". If this option is selected, then the physical position for the object is set using the vertical and horizontal positioning options. | | |
| Horizontal Position | Set the horizontal absolute position of an object as either left, center, or right in px, pt, %, calc, vw, vh, vmin, vmax, or auto. Center may disable the user's ability to enter a value, and instead the position may be calculated. | | |
| Vertical Position | Set the vertical absolute position of an object as either left, middle, or right in px, pt, %, calc, vw, vh, vmin, vmax, or auto. Middle may disable the user's ability to enter a value, and instead the position may be calculated. | | |
| End Object Size and/or Positioning | | | |
| Begin Object Styling | | | |
| Background | Options:<br>Background Color<br>Upload a background image<br>Object Opacity<br>Background Opacity<br>Background Gradient | | |
| Cursor | Select the style of the cursor that may appear when the user places the mouse over the object. | | |
| Shadow | Set inner or outer shadow with a horizontal length, and vertical length, a blur, a spread, a color, and an opacity for the shadow. | | |
| Font | Options:<br>Font - integrated with third party fonts (e.g., Google ™ Fonts), or user may upload their own font<br>Font Size - in px, pt, %, vw, vh, vmin, or vmax<br>Font Color<br>Line Height - in px, pt, %, vw, vh, vmin, vmax, or auto<br>Bold<br>Italics<br>Underline<br>Wrap Text - Yes/No | | |

TABLE 1-continued

| Name | Description | May be used with | Example use case |
|---|---|---|---|
| Horizontal Content Alignment | Set the interior horizontal content alignment to left, center, or right | | |
| Vertical Content Alignment | Set the interior vertical content alignment to top, middle, or bottom | | |
| Borders | Options for each border (left, top, right, bottom borders) Color Line Style - solid, dashed, or dotted Size - in px, pt, %, vw, vh, vmin, vmax, or auto | | |
| Border Radius | Set each corner of the object to have a radius in px, pt, %, calc, vw, vh, vmin, vmax, or auto | | |
| Margin | Set each margin of the object (left, top, right, bottom) in px, pt, %, calc, vw, vh, vmin, vmax, or auto | | |
| Padding | Set each padding of the object (left, top, right, bottom) in px, pt, %, calc, vw, vh, vmin, vmax, or auto | | |
| Style Duplication | Allows the user of the platform to duplicate a style into a new style | | |
| Style Hover State | Allows the user of the platform to set a particular style for when the end user hovers the mouse over the object with the style | | |
| Style Nesting | Allows the configurator to select a nested style that uses the inherited style and then adds the nested style attributes to override the inherited | | In an application, most "Title" text boxes may use a style called "Text - Title", however, for one Text Box the configurator may want to be the same as the normal title, but with a border on the bottom. In this case, configurator can create a second style called "Text - Bottom border" and then add this as a nested style for this particular object. |
| End Object Styling | | | |
| Begin OBJECTS | | | |
| Containers | A container is a DIV in the browser. All other objects, including other containers can be nested inside of a container in any position method. | | |
| Layered Containers | Groups a set of containers into a single "parent" container, where only one of the child containers may be visible at a time | Next/ Previous Layer Action Activate Layer Action | |
| Fixed Containers | These are just absolute positioned regular containers with a few special properties like automatically creating a light box. | | |
| Text Box | Enter static text that may display on the page | | |
| Box | An absolute positioned container that is nested within another container | | |
| Table View | Displays a set of records from a filterset | | |
| Field | A field is an object where the user inputs data either to be stored in a table column or to be used as a variable in a form for the user. Field types are described below | | |
| QR Code | This is a DIV where user selects a field on the form and it may display a QR code of that value in the DIV. | | |

TABLE 1-continued

| Name | Description | May be used with | Example use case |
|---|---|---|---|
| Page Break | Inserts a page break into the form so that when the form is printed, the printed page may break at that position. This is primarily used for user generated forms, which are primarily used for printing. | | |
| Media Viewer | Allows an end user to upload images and videos into a viewable area | | |
| Form Rows | Allows for a filterset of records to be displayed in an order using a particular designed form. | | |
| Calendar | Displays a calendar of events from one or more data (event) sources and also relating to one or more data (resource) sources) for contextual display. This object can be styled to look and feel like any suitable calendar. In addition, the events are clickable if enabled into any container of the configurator's choice making it a fully functional calendar. The configurator can also enable drag and drop and enable any number of views including Day, Week, Month, and Resource views. | | |
| Charts | Charts take data from a filterset, or from a table view and represent the data to the user. The selection of data to represent can be pre-set by the platform user, or the end user can set it, or both. Many chart types are available including Pie, Bar, Column, Line, Area, Scatter Plot, etc. | | |
| Marketplace Plugins | Allows the Platform user to select a container, form, or sets of forms of objects (including the actions and filterset to sustain those objects) and name them as a "plugin". This set of Objects, Events, Actions, Filtersets, etc., can then be licensed by another user of the Platform for their own purposes | | |
| Configurator Plugins and/or component | Allows the configurator (e.g., Platform user) to select a container, form, or sets of forms of objects (including the actions and filterset to sustain those objects) and name them as a "plugin". This set of Objects, Events, Actions, Filtersets, etc., can then be used in the same application again, or in another application the Platform User has created | | |
| Duplicating Objects | Allows the Platform User to duplicate an object or container including the styling, events, actions, nested objects, etc. | | |
| Inserting Objects from another form | Allows the platform user to insert an entire form, a container of objects, or a single object from one form to another | | |
| Multi-Select Objects | Allows the Platform User to select more than one object and then modify certain attributes of the object such as the event/action being called, size, position, style, properties, etc. of the multiple objects. | | |
| Copy/Paste Size | Allows the Platform user to copy the "Size" of an object and paste that size onto another object | | |
| Copy/Paste Properties | Allows the Platform user to copy the "Properties" of an object and paste that size onto another object | | |
| Copy/Paste Position | Allows the Platform user to copy the "Paste" of an object and paste that size onto another object | | |
| End OBJECTS | | | |

TABLE 1-continued

| Name | Description | May be used with | Example use case |
|---|---|---|---|
| Begin SYSTEM ASSETS | | | |
| Home Pages | Home Pages are the main forms that end users of a deployed applications first see when they login. These can be set per user so that different users have different starting screens. Security permissions restrict the end user's access to the information so that they can only access information accessible through the configuration of that home page | | |
| Data APIs | Allows a configurator to create a consumables API for accessing tables of data in the configured system. Token and security management is handled automatically, and the configurator can select expiration requirements per token. | | |
| Action APIs | Allows a configurator to create a consumables API for accessing actions on particular data in the configured system. Token and security management is handled automatically, and the configurator can select expiration requirements per token. This means that any Action in the platform can be called and used without an end user actually logging in through the web-browser | | |
| Styles | CSS style properties stored and applied to one or more object in a system. These can be nested (inherited) as traditional CSS can be | | |
| Data Sets | Each Data Set represents a table of data in a relational database or in a flat file hierarchy. | | |
| Forms | A form is a visual representation of the data in a data set, combined with other visual elements, actions, filtersets, etc. | | |
| Filtersets | A filterset is a data relationship between two sets of data. This data is filtered by static values, contextual field values, other related data relationships, or system variables. | | |
| User Forms | These are forms that are configurable by an end user and then made accessible in certain parts of a system by a configurator. | | Print Views of a transaction |
| Home Page Filtersets | Filtersets that are available system wide | | Commonly used for static list data that is re-used over and over again in a system |
| Home Page Values | Fields that are available system wide | | Commonly used for static values such as user specific permissions so that the data only needs to be loaded a single time per session |
| Scheduled Home Page Actions | Actions that are run automatically on a schedule defined by the configurator. | | Automatically produce a report and email it to a user every day at 6 AM |
| External Data Sources | Allows a user to use an API to gather data for a particular use within their system | | Get the current list of tax rates from a State's API for use on an invoice |
| End SYSTEM ASSETS | | | |
| Begin FIELDS | | | |
| Text | A field where any text value can be entered. Text fields have default values and can be set to auto-fill. | | |
| Date/ Time | A field where a date, time, or a date/time value can be stored. The adjusts automatically based on the end | | |

TABLE 1-continued

| Name | Description | May be used with | Example use case |
|---|---|---|---|
| | user's time zone and date format settings. There are also settings to limit the time that can be entered as well as the intervals that the user can enter. There are also settings to display 24 hour time, seconds, minutes, hours, days, months, and years. | | |
| Checkbox | A field where a true/false value is represented as a "check" inside of a "box" | | |
| Menu | Menu fields allow the end user to select from a menu of options. The options in the menu field can be statically entered by a user, or they can come from another data source such as a filterset, or an external set of data from an API. The menu options can be sorted alpha-numeric, manually, or if they are coming from another data source, then a specific column of data from that source can determine the sort in ascending or descending order. The menu options can be grouped into common sub-menus. Subsequent levels of the menu can be based on another filterset when a key field is mapped. The text and background colors of the menu values can be set statically using the "Style" editor overall for the field, but can also be overridden by "color" values in the records of data that are mapped in a filterset that is creating the dynamic menu options. There is also an option to display the menu as a native menu or as the Platform's custom built menu. Some of the properties above are not available in native menus. This option can decide whether to use the native menu all the time, only when on mobile devices, or only when on non-mobile devices (PCs, Macs, etc.) | | |
| Calculation | Calculation fields allow the user to enter a formula to calculate a particular value. The formula can be made up of other fields, static numerical values, as well as other filter sets of data. Functions for rounding, performing calculations on dates, and more are built in. | | |
| Date Calculation | Allows a date value to be calculated into formatted date value | | |
| Number | Number Fields allow the user to enter numerical values into a field with options for auto-fill, comma, minimum value, maximum value, minimum number of decimals, maximum number of decimals, step, leading zeroes. | | |
| Email | Allows the end user to enter an email address, and the browser may interpret it as such. This field can also be set to validate that the email is correctly formatted. | | |
| Color | Allows the end user to use the native color palette on their device to pick a color. The color value is stored in hexadecimal color value, but represented in the browser as the color filling the field space. | | |
| Radio | Radio buttons have the same options as menu fields, but they display each option as a radio button selection where only one can be selected at a time. | | |
| Multi-Select | Radio buttons have the same options as menu fields, but more than one option in the menu can be selected at a time. | | |

TABLE 1-continued

| Name | Description | May be used with | Example use case |
|---|---|---|---|
| Phone | Allows the end user to enter a phone number, and the browser may interpret it as such. This field can also be set to validate that the phone number is correctly formatted. | | |
| Password | Allows the end user to enter a password, and the browser may interpret it as such. This field can also be set to validate that the password is correctly formatted. | | |
| Range Slider | Allows the end user to use a slider bar to specify a numeric value | | |
| Auto-Number | This is a number value that automatically generates the next number for each new record. End users are not ever able to override this value. This is typically used as a key value throughout the platform. | | |
| End FIELDS | | | |
| Begin Field Properties | | | |
| Auto-Fill | Allows the user to set a field to fill in its value from a column of data. Properties include to fill only when all values for that column of data are the same, or from the first row, or from the last row, sorted in a direction by a column of the data. The configurator can also set if the user is allowed to modify the field, and also if the system is allowed to update existing values in the field. In addition, the configurator can set whether or not the system can update values that have been overridden by an end user. | | |
| Default Values | All fields can have default values that may automatically be used when new records are created. | | |
| Allow User Edit | Allows a user to edit the value | | |
| Allow System Override of User Edit | Allows the system to override a user's edit of a value | | |
| Changing Field Types | When a field's type is changed, and it is changed between a true/false (checkbox), a number/calculation, or a text value, the additional numerical values are stored in a separate internal database column just in case the field is every switched back and the data is needed. | | |
| Character Limit | Any string (text) based field type can have a character limit applied to it to keep the user from entering more characters in the field | | |
| Use Composite Field Values | Allows a field to get its value from a composite of other field values. Date and time zone formatting are handled automatically in the composition, as are field settings such as leading zeroes, trailing decimals, | | |
| Deleting Fields | When a field is deleted from a form, it is only deleting that one input, the database column is still there, so the field can be placed back on the form if needed. If the user deletes the field from the entire system, this only deletes it from the development environment. Upon deployment of the change, the data column in the table is preserved so that the user can restore the field if needed and no data may be lost. | | |

TABLE 1-continued

| Name | Description | May be used with | Example use case |
|---|---|---|---|
| End Field Properties | | | |
| Begin User Events | | | |
| On Click | When a user single clicks/taps on an object, the Action Group defined may execute. | | |
| On Double Click | When a user double clicks/taps on an object, the Action Group defined may execute. | | |
| On Change | When a user modifies a value in a field and then moves away from the field, the listeners hears that there was a change and the Action Group defined may execute. | | |
| On Focus | When a user places the cursor's focus into a field, the Action Group defined may execute. | | |
| On Blur | When a user removes the cursor's focus from a field (by clicking somewhere else on the page or "tabbing out" of the field, the Action Group defined may execute. | | |
| On Mouse In | When a user moves the cursor to where it enters the dimensional plane of an object, the Action Group defined may execute. | | |
| On Mouse Out | When a user moves the cursor to where it exits the dimensional plane of an object, the Action Group defined may execute. | | |
| As User Types | As the user modifies each character in a field, the Action Group defined may execute. | | |
| Window Width Listener | As the browser window height or width is changed, the Action Group defined may execute. | | |
| Key Stroke Events | Allows the Platform user to define up to three keys that when held together may call a specific action on the form for the end user | | The Platform user could define that when "g" "h" and "j" are all held together, that a certain action may be performed |
| End User Events | | | |

Figure 2:
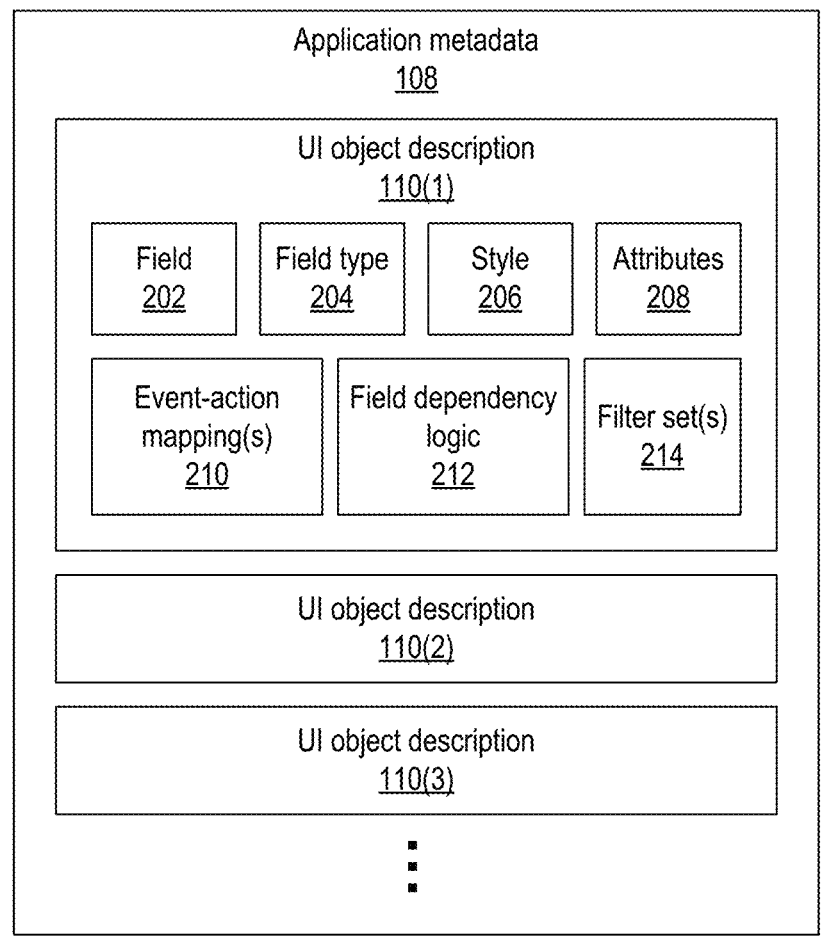
FIG. 2 depicts a schematic of example metadata describing an application, according to implementations of the present disclosure.

The configuration UI 106 may include a control to enable the configurator 102 to save the current configuration for the application 116. In response to a save command through the control, the Platform 104 may generate application metadata 108 that describes the user-specified configuration of the application 116. FIG. 2 depicts a schematic of example application metadata 108 describing an application 116, according to implementations of the present disclosure. As shown in the example of FIG. 2, the application metadata 108 may include any appropriate number of UI object descriptions 110, and each UI object description 110 may include metadata describing a particular UI object specified by the configurator 102. The application metadata 108 may describe any appropriate number of objects at any layer of the application 116. The application metadata 108 may also describe any appropriate number of filtersets that indicate relationships between the objects and/or actions to be performed. In some implementations, UI Objects are metadata that a custom JavaScript draw function uses to draw the object. The execution core delivers all of this to the browser within the single page web application and then executes the draw function to draw the object based on its metadata. A UI object description 110 may include but is not limited to one or more of the following:

A field 202, such as the name of the field to hold data entered and/or presented through the UI object;

A field type 204, such as a data type of the field 202;

A style 206 of the UI object, as described above;

Attribute(s) 208 of the UI object, such as dimensions (e.g., height, width) and position (e.g., x, y, z-depth) of the UI object, text font, font size, color, padding, alignment, or other attributes of a text UI object, and so forth. Attribute(s) 208 may also include options such as the number of characters allowed in a UI object, whether particular characters (e.g., carriage returns) are allowed in a UI object, and so forth;

Event-action mapping(s) 210, describing the event(s) to be handled for this UI object as well as the one or more actions to be performed by the application 116 in response to each event;

Field dependency logic 212, describing one or more dependencies between the field 202 and other field(s); or Filter set(s) 214, describing chains of dependencies between fields and other sets of data within the application being configured.

One or more of the above may also be included in the description(s) of other types of objects in an application. For example, a filterset for a table view object may also be used for other types of objects that build the table view. In some instances, such a filterset may be used for the other objects that build the table view, but may not be used in the table view object itself.

Returning to FIG. 1, the Platform 104 may include one or more build modules 112. The build module(s) 112 may access the application metadata 108, generate code for the various UI object(s), and generate code for other objects, such as middleware objects and/or data access objects. In some implementations, the build module(s) 112 may access pre-written object code 114 for one or more of the objects to be generated, and incorporate that pre-written object code 114 into the generated code of the objects for the application 116. The pre-written object code 114 may include source code, compiled (e.g., object) code, or both. At the level of the code generated by the Platform 104, there may be various types of pre-written objects (e.g., code objects). For example, a HTML element object, such as a field object, may include HTML with various associated properties. A JavaScript object may be related to the HTML element object, as well as to any actions associated with the HTML object. In some implementations, possible actions are listed in a JSON file accessible by the Platform 104. The Platform may generate code for an action by copying from the action listed in the JSON file, and adding appropriate parameters to the generated code. The parameters may correspond to options that are selectable as inputs to the application 116. A JavaScript object may be connected to Active Server Page (ASP) or nodejs objects for back end processing. Implementations also support the use of other languages.

In some implementations, the Platform 104 may include a set of files containing core object information (e.g., JavaScript files). The parameters set by a configurator 102 for a particular instance of an action may be stored in a JSON file of the UI object that the action was created for. For example, in a customer relationship management (CRM) application, there may be a "Customer" form, and this form may have a corresponding JSON file that holds the parameters of all objects and actions that have been created for this form. If the "New Record" action is used multiple times on that form, there may be multiple entries in the JSON file for that type of action, each entry having its own set of parameters.

In some implementations, the build module(s) 112 may generate source code for the objects of an application, and build the source code to generate the executable application 116. Building may include compiling source code, linking compiled code modules, or other operations. In some implementations, the build module(s) 112 may access pre-written object code 114 that includes executable code for various objects, and that executable code may be incorporated into the generated objects without further compilation. Accordingly, the build module(s) 112 may build source code to generate object code, incorporate pre-compiled object code, or employ any combination of previously compiled or currently compiled code to create the executable application 116. As described above, the application 116 may include various layers such as a front end layer 118, a middleware layer 120, and a data access layer 122. The Platform 104 may also support the creation of applications 116 that have more layers, fewer layers, or different layers, as specified by the configurator 102. In some implementations, the Platform generates metadata that describes the components of an application, and the metadata may be used to generate code for the application, at various levels of components, when the application is executed. In this way, a build of the application may be a runtime merge of the metadata for the components at each level with the code that is generated at runtime for various components, to present the application to an end-user.

The Platform 104 may include one or more deployment modules 124. The deployment module(s) 124 may deploy the executable application 116 to a deployment environment 126. The deployment environment 126 may include any suitable number of computing devices. Although FIG. 1 shows an example in which the deployment environment 126 is separate from the computing environment where the Platform 104 executes, implementations are not so limited. In some implementations, the deployment environment 126 may include one or more computing devices that also execute the Platform 104. The deployment environment 126 may be a test environment in which the application 116 may be tested to ensure that the application 116 behaves as intended by the configurator. Testing may also measure performance characteristics of the application 116, determine usability, or measure other aspects of executing application 116. The deployment environment 126 may be a production environment in which the application 116 is executed to be accessible by end-user(s) 132, such as customer(s) accessing an ERP application. In some implementations, the Platform 104 obfuscates the executable code of the application 116 prior to deploying the application 116 to an execution environment. Such obfuscation may prevent other parties from reverse engineering the executable code to determine the source code used to build the application 116. In instances where the Platform 104 deploys human readable code to an execution environment, such code may also be obfuscated to prevent copying by unauthorized parties.

In some examples, a particular application 116 may only employ a subset of the pre-written objects (e.g., JavaScript objects) available in the Platform 104. In such instances, only those objects employed by the application 116 may be included in the built and deployed application 116. Similarly, the Cascading Style Sheet (CSS) files of the deployed application 116 may only include those style sheets that are actually used by the application 116 during its execution.

In some implementations, the deployment module(s) 124 may also create or update database table(s) 130 in data storage 128. For example, for each of the various fields corresponding to UI objects specified by the configurator 102, the deployment module(s) 124 may generate a column in a database table 130 to store data for the field. Implementations may support the use of any suitable type of data storage 128, including relational or non-relational data storage.

The Platform 104 may include features to support previous, e.g., deprecated, versions of an application 116. For example, where a later version of an application 116 no longer includes a front end UI object corresponding to a column, the Platform 104 may keep that column in the database table(s) 130 to support previous versions of the application 116 that may still rely on data from that column. In some cases, the Platform 104 may allow configurators 102 to "delete" fields but may keep those fields intact in the back end, and hide the "deleted" fields from the configurator 102, to ensure backward compatibility with previous versions of the application 116.

In some implementations, the configuration UI 106 may present a list of filter sets that may be selected by the configurator 102 to specify data access operations, such as reads, writes, updates, deletions, and so forth, that may be performed against data stored in the database table(s) 130. The filter sets may be employed to specify data access operations without requiring the configurator 102 to write queries in structured query language (SQL) or other data access languages. Filter sets may specify sets of data to be retrieved. In some examples, a filter set may reference other filter sets to perform operations analogous to a join operation. Filter sets may be nested to any suitable number of levels. Filter sets create application logic that is executable at the data access layer. Filter sets may reference the names of fields in the UI. Filter sets may use nested AND, OR, NOT, or other logical operators for filtering in combination with other filter sets or static values. Filter sets may examine contextual field values to find relevant results. Those results may be used to enable other objects and actions such as a table view or a conditional action that is based on the data found in the filter set.

Database updates may be performed by actions that create, modify or delete records. Filter sets may be used to retrieve data from the database table(s) 130 for one or more uses in the middleware layer 120 or in the front end layer 118. Filter sets can be filtered by one or more of the following: static values; field values; other filter set columns; contextual data that is present on a form for the opened record; or in the database for a record that is not visible by the configurator in the UI. Examples of filter sets include filter sets to gather the array of data for a table view, to provide the value of a calculation field that derives its value from a number or calculation column of a filter set, or to implement conditional logic that uses the filter set to determine if a certain value is present in one or more columns in a set of records.

In some implementations, the Platform 104 may generate metadata of the application 116 to include certain optimization with respect to the presentation of a UI in the front end layer 118, with respect to the processing of data in the middleware layer 120, or with respect to data access operations performed by the data access layer 122. For example, the application 116 may be created to dynamically adjust the size of UI objects if they are opened contemporaneously in the front end layer 118 of the executing application 116. In some implementations, the Platform 104 may determine automatically when such adjustment may be necessary. The Platform 104 may also provide such an optimization as a selectable option for the configurator 102 during the configuration phase. For example, the configurator 102 can set objects on the form to be percentage-based, calculation-based, or viewport-based in their width or height. The configurator 102 can also set the window width listener to call an action when the window width goes above or below one or more specified widths, and that action may change the size of various elements on the form. Conditional logic can also check whether an object is currently visible to the end-user 132. Based on whether an object is visible, other action(s) such as a resize or reposition action may be called.

The Platform 104 may be configured to generate the metadata for an application 116 that is optimized to execute on particular types of computing devices. In some implementations, the configurator 102 may specify a width of the viewport for the target device, to instruct the Platform 104 to generate the metadata for the application 116 to execute on a device with a smaller display (e.g., smartphone, wearable device, etc.) or larger display (e.g., desktop computer, laptop, etc.). The configurator 102 may also configure the resizing actions to handle different display sizes automatically. The Platform 104 may generate the metadata for applications 116 that are configured to execute on various operating systems, including mobile operating systems such as iOS and Android.

In some implementations, the Platform 104 supports dependencies between back end operations such as data access operations performed by the application 116. For example, the configurator 102 may specify that various data access operations are to be performed as part of a transaction, such that the operations are all rolled back if at least one of them fails. The configurator 102 may specify conditional logic to determine the results of each operation in a multi-operation transaction. The configurator 102 may also specify an application element to store the data being changed with each operation, and specify conditional logic based on the result of each operation to determine what the application 116 is to do next.

Figure 3:
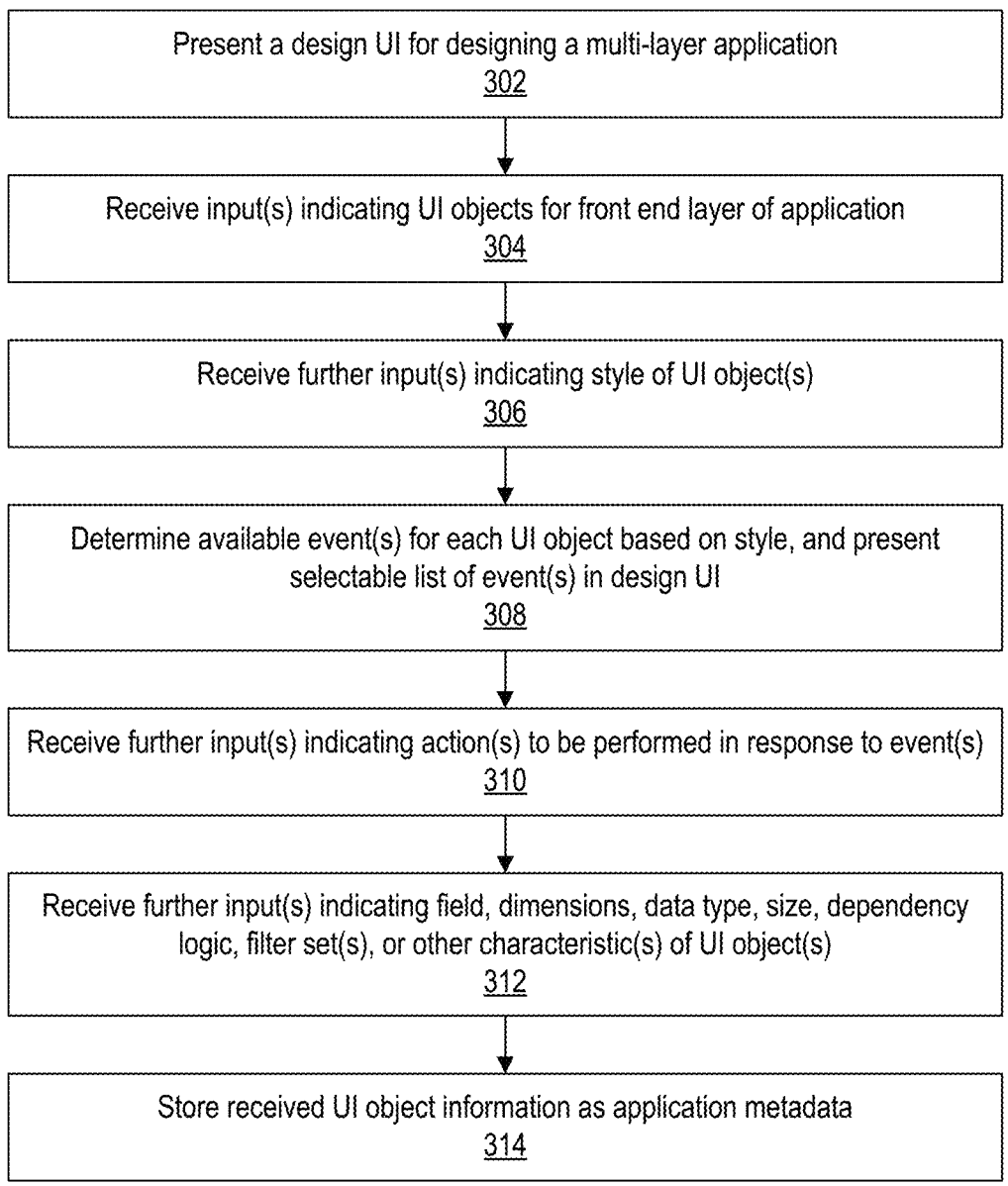
FIG. 3 depicts a flow diagram of an example process for generating application metadata based on user inputs to a configuration user interface, according to implementations of the present disclosure.

FIG. 3 depicts a flow diagram of an example process for generating application metadata 108 based on configurator inputs to a configuration UI 106 of the Platform 104, according to implementations of the present disclosure. Operations of the process may be performed by one or more of the Platform 104, the configuration UI 106, the build module(s) 112, or the deployment module(s) 124.

A configuration UI 104 may be presented (302) for configuring a (e.g., multi-layer) application 116.

One or more inputs may be received (304) through the configuration UI 106, the one or more inputs indicating UI object(s) to be included in the front end layer 118 of the application 116. Input(s) may also be received (306) indicating the style of the various UI object(s).

Based on the style of each UI object, a set of available event(s) may be determined (308) for each specified UI object. The configuration UI 106 may present a list or other control to enable the configurator 102 to select event(s) to be handled by the application 116 for each UI object. Input(s) may be received (310), via the configuration UI 106, specifying one or more actions to be performed in response to each event. Such action(s) may be mapped to event(s) as described above.

One or more inputs may be received (312) indicating field, field name, dimensions, data type, size, dependency logic, filter set(s), or other characteristic(s) or attribute(s) of the various UI object(s) or the fields associated with the UI object(s).

The information received regarding UI objects, event(s), action(s), and characteristic(s) may be stored (314) as the application metadata 108 for use in generating the application 116.

Figure 4:
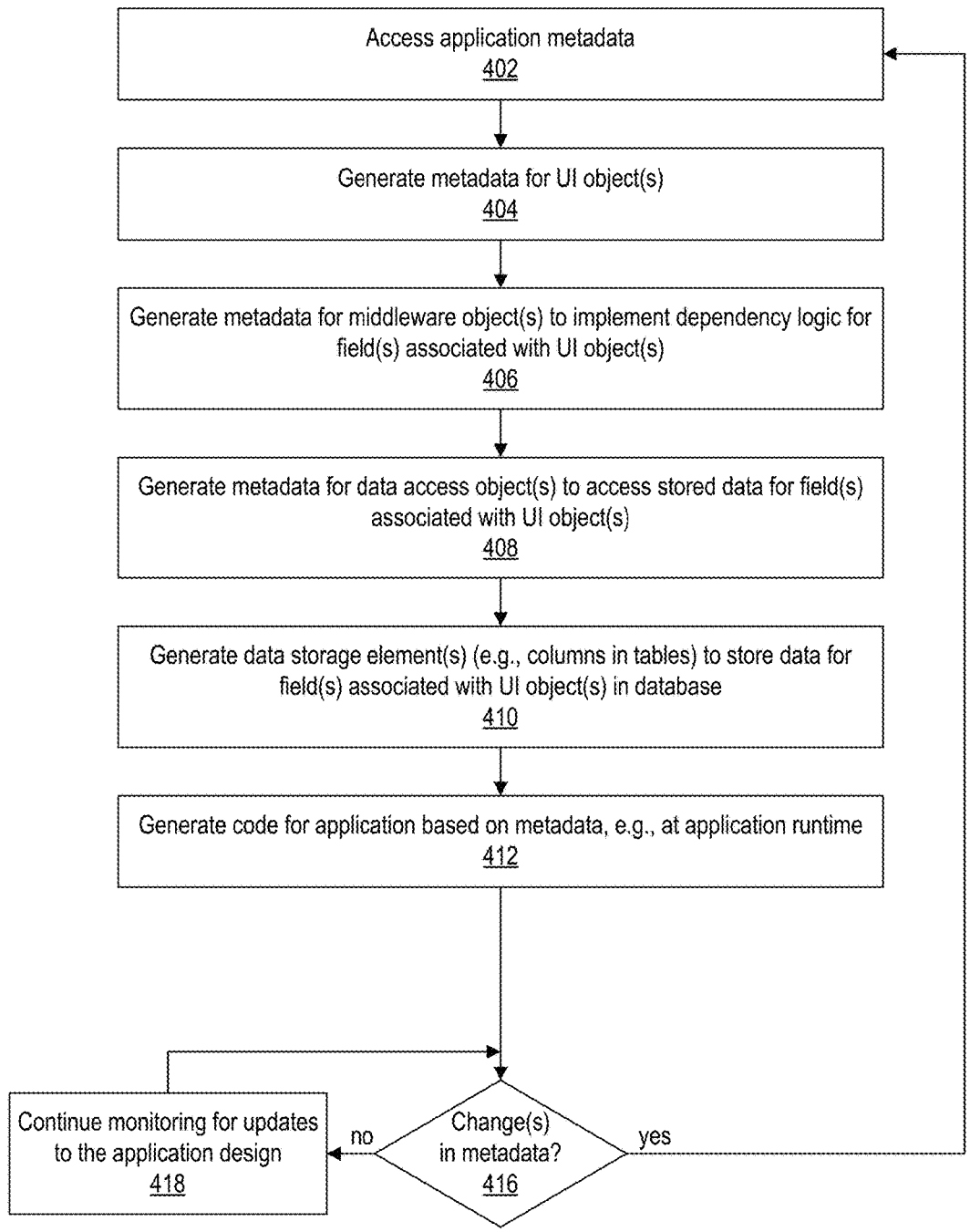
FIG. 4 depicts a flow diagram of an example process for generating, building, and deploying an application based on application metadata, according to implementations of the present disclosure.

FIG. 4 depicts a flow diagram of an example process for generating, building, and deploying an application 116 based on the application metadata 108, according to implementations of the present disclosure. Operations of the process may be performed by one or more of the Platform 104, the configuration UI 106, the build module(s) 112, or the deployment module(s) 124.

In response to a build command entered by the configurator 102 through the configuration UI 106, the application metadata 108 may be accessed (402). Metadata may be generated (404) for the various UI object(s) described in the application metadata 108. Metadata may be generated (406) for middleware object(s) to implement dependency logic for the field(s) associated with the UI object(s). Metadata may also be generated (408) for data access object(s) to access stored data for the field(s) associated with the UI object(s). In some implementations, data storage element(s) may be generated (410), such as columns for database tables, to store data for the field associated with the UI object(s). The middleware object(s) may also implement logic other than logic to create dependencies between UI objects.

At runtime, the code for the application 116 may be generated (412) based on the various sets of metadata 108 associated with components at the various levels of the application, as well as the application level metadata, as described elsewhere herein. The application 116 may be executed in the environment 126, such as a test environment or production environment. In some examples, the code for the various objects of the application 116, such as HTML, CSS, JavaScript, and so forth may be generated at runtime based on the metadata and bound to one another during the form rendering for the application UI (e.g., in a web browser or other execution container). In some implementations, the application 116 may execute within an execution environment or framework (e.g., the Framework) such as that described further below.

In some implementations, the Platform 104 may monitor the application metadata 108 to determine whether the configurator 102 (or some other configurator 102) alters the configuration of the application 116. If changes are detected, the process may return to 402 and rebuild the application 116 to include the changes. If changes are not currently detected, the process may continue monitoring (418) for updates to the application configuration as indicated through the application metadata 108. As described above, in response to changes the application 116 may be incrementally rebuilt. For example, only those object(s) which have been changed may be rebuilt and/or updated in the deployed version of the application 116.

In some implementations, an action employs a filter set which is specified independently of the action. For example, various actions may employ any of a number of filter sets, and the configurator may specify which filter set is to be employed by an action. Implementations may enable the configurator to specify a (e.g., complex) chain of filters for an action. For example, one set of records may be dependent on another set of records, which in turn may be dependent on one or more context values, which in turn may be dependent on the identity of the end-user, and so forth. The filters may be based on one or more of the following: particular value(s) stored in database record(s); context values; end-user identity; static variables set at configuration time by the configurator; and so forth. Any number of filter sets may be combined in any order to configure particular actions. In one example, a filter set may be specified such that a particular action is performed by the application in response to the end-user clicking a button in the application UI, and such that the particular action is performed if a variable (e.g., static variable, or field of a stored record) has a particular value. A filter set may be tied to a data object, or may be tied (e.g., indirectly) to a data object via one or more actions.

A configurator may use the Platform to define a filter set, which may then be used in any number of roles in the application. For example, the configurator may add a table view object to a form, and may specify a particular filter set that is used to build the data to be presented in the table view. The configurator may also specify the same filter set to be used in a Calculate Records action. The configurator may select a set of columns from the filter set, and when the action executes the action may re-calculate or duplicate (e.g., based on the dependency logic in the application) the selected columns in the filter set of records. The filter set may include a dependent filter set that is based on the contextual values of the record that the end-user is in when the action is called. Thus, the filter set may enable the display of the same set of records under similar conditions in both a Calculate Records action and in a table view. One or more filter sets may be applied to a table to generate another table that is filtered (e.g., reduced) according to the logic specified in the filter sets.

As another example, a filter set may be employed to build line items to be presented in an order in the UI of the application. The configurator may specify a filter set named "Line Items." The filter set may be associated with a table that stores order data, and the filter set may filter the order data based on an order ID (e.g., a primary key of the order data table). The configurator may then add a table view into a form, indicate that the Line Items filter set is to be used to build the table view, and select the columns to be displayed in the table view. The configurator may also specify an API action that sends the records in the table view to an external API, such as an API exposed by accounting software that executes separately from the application. The same filter set may also be employed in the API action. Filter sets, actions, and objects may all be specified independently of one other, and the configurator may employ the Platform to combine filter sets, actions, and/or objects in any suitable manner to specify any number of complex operations to be performed by the application. Such combinations may be specified by the configurator without requiring the configurator to write source code for the operations to be performed.

In some implementations, the Platform may include features that enable the configurator to define a set of objects, events, and/or actions as a plugin. The plugin (and/or other components at other levels) may be saved and reused, by the same configurator or others, in other application(s). For example, a configurator X may select a plugin previously created and saved by configurator Y. The configurator X may then specify a set of mappings to incorporate the plugin into their application. For example, configurator X may configure the application to present an invoice with a set of line items, and may employ the plugin to specify which columns of the line items are to be displayed in the invoice. In examples where the plugin was previously created to present an order with a set of line items, the configurator may modify the plugin to process records according to invoice ID instead of order ID. A plugin can be a (e.g., small) portion of an application. In some instances, a plugin may be an entire application, or a larger component of an application. For example, a plugin may be an entire Invoice with all forms, objects, events, actions, and so forth, including filtersets and the data needed for the filterset, such as Invoice Line Items. In this example, the plugin may be an Invoice, with Line Items and an API configured to send to a third party accounting system.

Although examples herein may describe the Platform generating an application that includes a front-end layer, implementations are not so limited. In some examples, the Platform may be used by a configurator to configure an application that includes a middleware layer and a data access layer, but not a front end layer. For example, an application may execute a middleware layer as an API that is callable by other processes, and that receives data that causes updates to stored data by a data access layer. In general, implementations enable the generation of an application that includes at least two different layers, where the layers may include a front end layer, a middleware layer, and/or a data access layer. The specification of first layer object(s) in the configuration UI by a configurator may cause the Platform to automatically determine, and generate code for, second layer object(s) without requiring the configurator to specify the particular second layer object(s).

Figure 5:
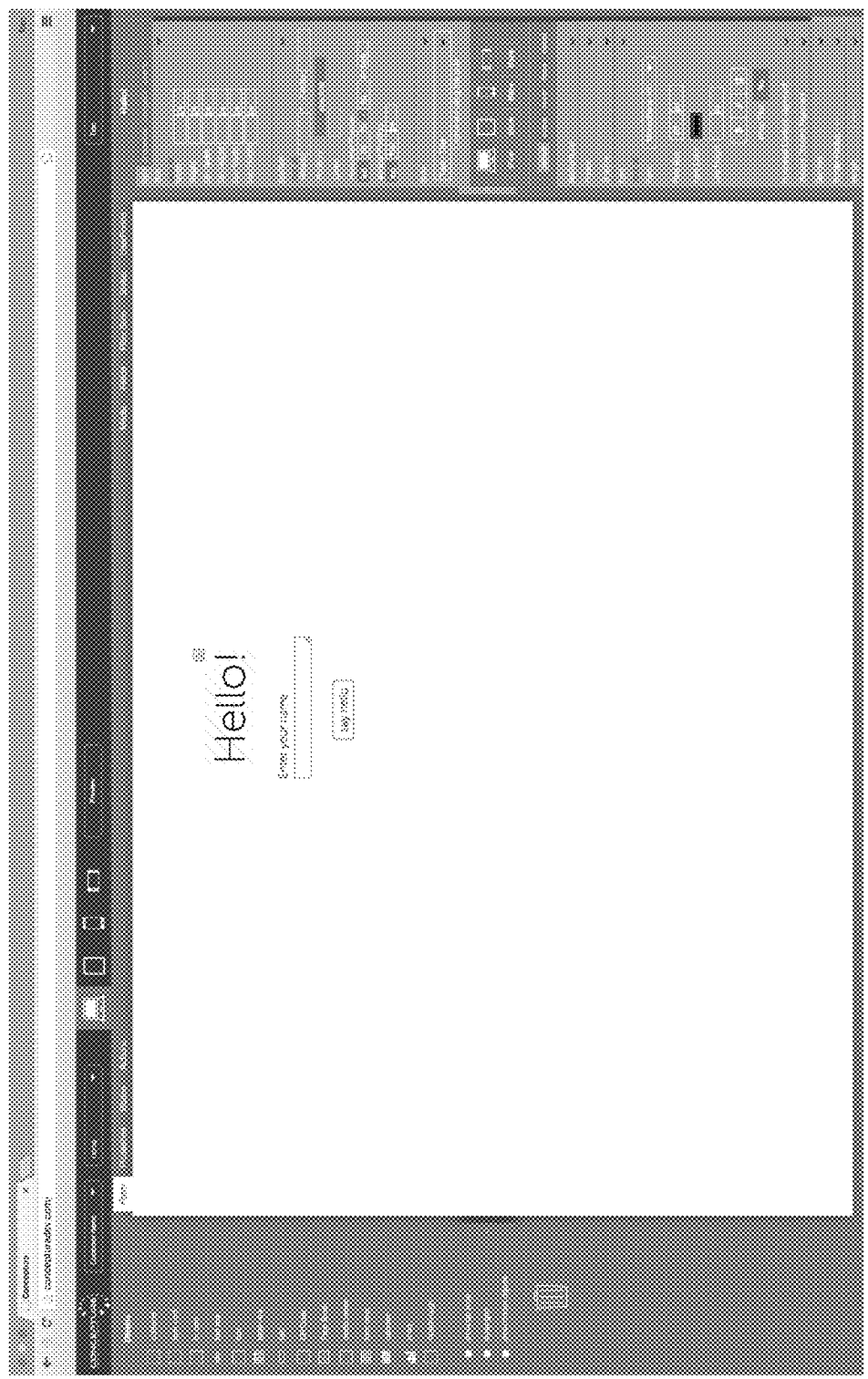
FIG. 5 depicts an example of a configuration user interface, according to implementations of the present disclosure.
Figure 6:
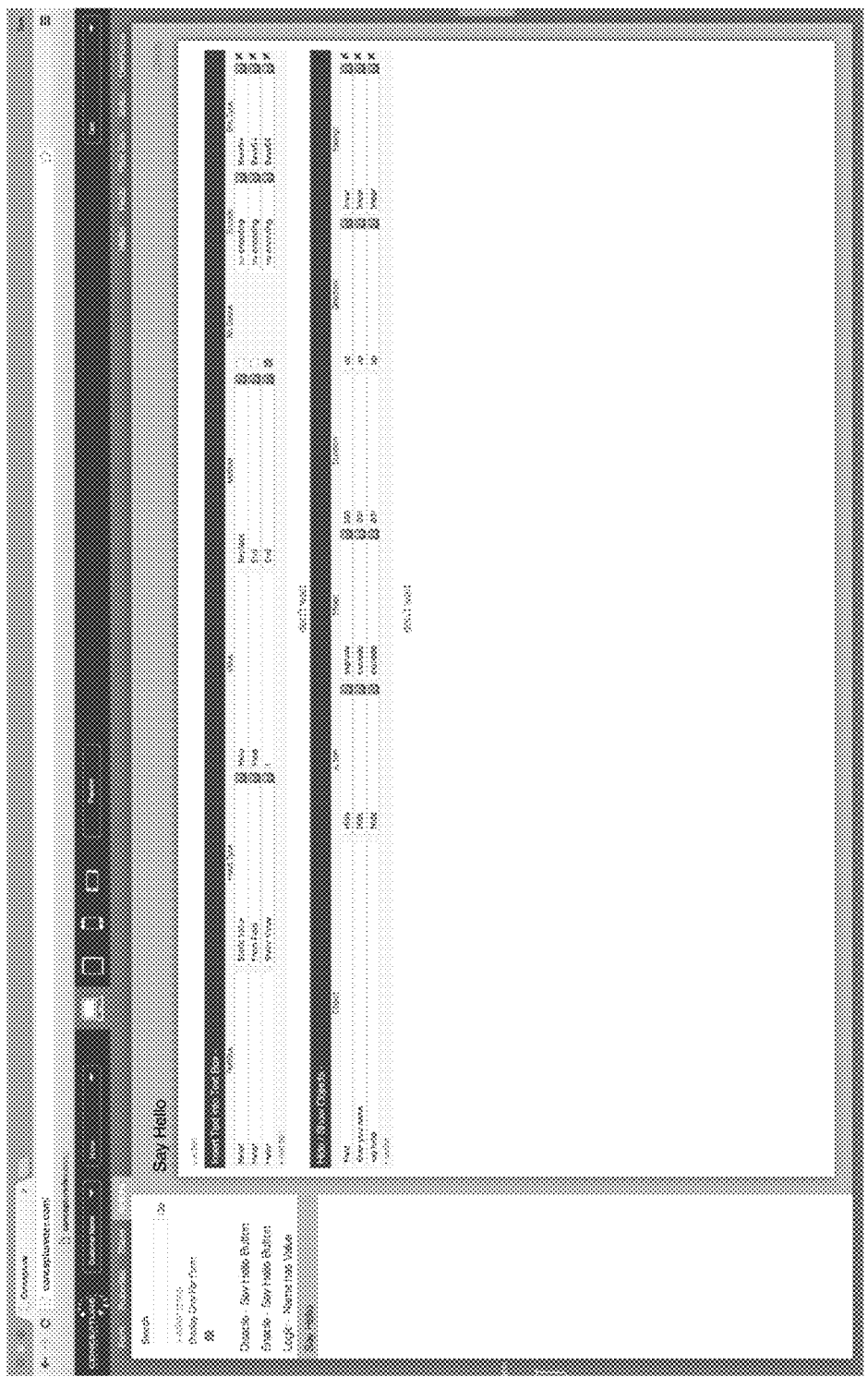
FIG. 6 depicts an example of a configuration user interface, according to implementations of the present disclosure.

FIGS. 5 and 6 depict examples of the configuration UI 106 of the Platform 104, according to implementations of the present disclosure. In the example of FIGS. 5 and 6, a configurator is employing the Platform to configure and generate a "Hello, World" application. In FIG. 5, the configurator has specified various UI objects to be included in the front end layer of the application, such as a text entry field, a button control, and text ("Hello!") to be presented in the UI of the executing application. In the example of FIG. 6, the configuration UI 106 is presenting a view that enables the configurator to further configure the application by specifying events, actions, values for actions, filter sets, or other information. Although FIGS. 5 and 6 present a particular arrangement of UI elements within the configuration UI 106, implementations are not limited to the example of FIGS. 5 and 6. The configuration UI 106 may include any suitable number of UI elements, in any suitable arrangement, to enable the operations of the Platform as described herein.

Figure 7:
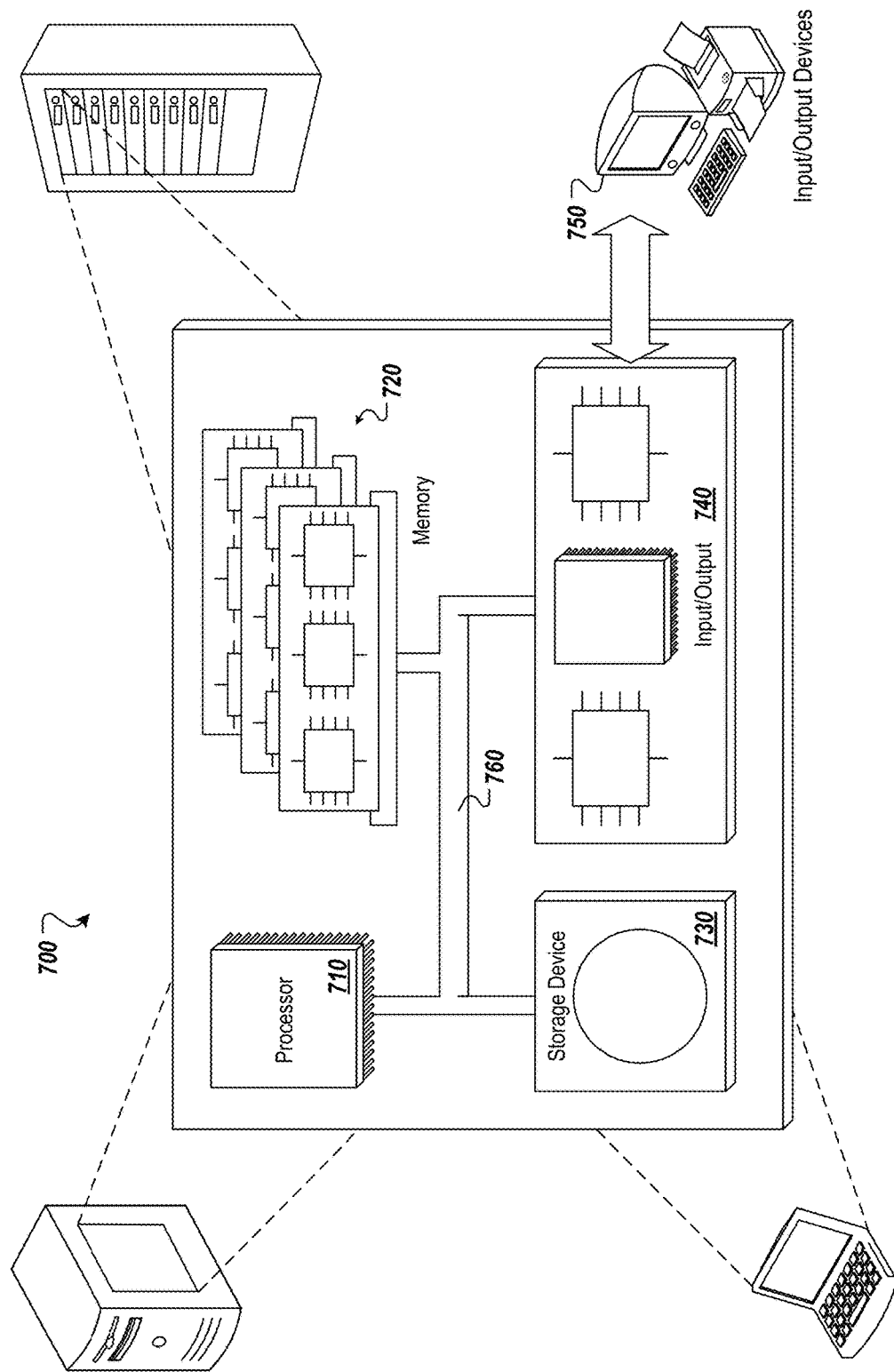
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more computing devices that execute the Platform 104 or that implement the deployment environment 126 and/or environment 902, as described herein. The system 700 may include one or more processors 710, a memory 720, one or more storage devices 730, and one or more input/output (I/O) devices 750 controllable via one or more I/O interfaces 740. Two or more of the components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any suitable number of volatile memory units, non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, a solid state drive, an optical disk device, a tape device, and/or any other appropriate storage device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any appropriate type of non-volatile memory, including but not limited to: semiconductor memory devices, such as EPROM, EEPROM, and flash memory devices; magnetic disks such as internal hard disks and removable disks; magneto-optical disks; solid state drives; and/or CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any suitable network protocol.

Computing devices of the system 700 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any appropriate number of computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

In some implementations, deployment environment 126 may be cloud computing environment, distributed computing environment, application hosting environment, and/or other type of infrastructure such as that provided by Microsoft Azure™, Amazon Web Services™, and so forth. In some implementations, the Platform 104 and/or data storage 128 may also operate within such an environment.

Figure 8:
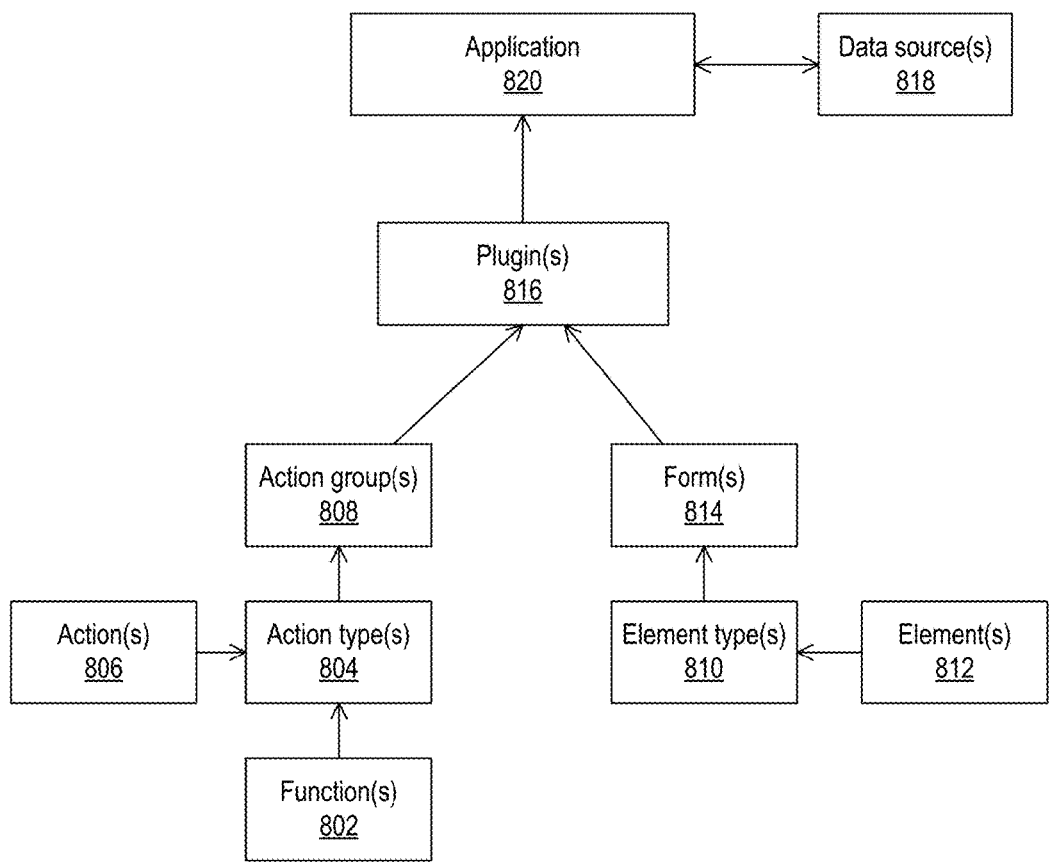
FIG. 8 depicts an example schematic of a hierarchical organization of application components, according to implementations of the present disclosure.

In some implementations, executable code for an application 116 may be organized into multiple components arranged hierarchically at multiple levels. FIG. 8 depicts an example schematic of a hierarchical organization of application components. In some implementations, application components may include functions 802, actions 806, action types 804, action groups 808, elements 812, element types 810, forms 814, plugins 816, data sources 818, and the application 820 (e.g., system). At each of these levels, a component may be packaged to include metadata that describes the component. A package may also include licensing information as described further below. License terms may be enforced automatically at runtime using hashing and signatures as described below. In some implementations, if a license includes term(s) for payment for code usage, such payment may be handled through a marketplace provided in the environment. Distribution of packaged components may also be handled through the marketplace, as described further below.

The application 116 and/or various components of the application may access the data source(s) 818 through the data source function(s) included in the execution core, as described further below. A component at any level may call into a data source 818 through the data source function(s). Data source(s) 118 may also have types and instances. For example, a data source type may be defined as a list of customers including various columns for customer name, ID number, address, email address, telephone number, and so forth. An instance of the data source may be a particular use of a data source type, and the instance may point to a particular database or other location where the data may be stored. A data source 818 may be used within a form, within an application, for a particular purpose. For example, a form may be a customer list form that includes a table view element on the form, and the table view may use the particular data source instance to display data from the data source instance. The table view may be packaged with a particular data source instance, or with a data source but without a particular data source instance. In the latter case, the data source instance may be provided at runtime (e.g., based on the particular logged in end-user) to enable the table view to access the particular data to be presented.

A plugin may include any suitable number of action group(s) combined with any suitable number of elements, such as form objects for presentation in a UI of the application. An action is a use or instance of an action type. An element is a use or instance of an element type. An element may include a set of attributes that are configured through the Platform. An element may also include code to render the element in a page presented in the UI of the application. An application is a collection of one or more plugins. A function is a callable code function that may be described using any suitable programming language.

Metadata may be associated with each function, and metadata may be associated with each action type and with each instance of the action type (e.g., each instance of that code use). An action type instance may be metadata that points to the executable code that is included in the various functions in the action type. The metadata for an action type instance may have values defined for each property of the action type. An instance of an action type is always described as an action. An action group is a collection of actions to be executed in a particular order. The metadata for an action group may indicate the included actions and the order of execution (e.g., serial and/or parallel execution of actions). An action group may execute in response to a detected user event in the application. Each action and/or action type may be associated with metadata that describes the function(s) that are included in the action, and the order in which the functions are to be performed, with the input and/or output arguments to be sent to and received from each function. An action group instance may include an action group, a set of actions in the group, and a set of functions for each action, and all of those may be executed in response to an event (e.g., a user's onClick).

Components at each of the levels can be packaged independently, licensed independently, and distributed independently. The ability to license a component may be dependent on the licenses associated with the sub-components included in that component. For example, an action type may include three functions. One function may be licensed for non-commercial use only, and the other two may be licensed for commercial use with a payment. In such instances, the action type may not be licensed and used for commercial use. However, the two included functions may each individually be licensed for commercial use.

The metadata for a component at each level may describe the contents of the package of the component at that level. The metadata may include license information for a level as well as an independent signature for each level. Code for components at each level may be kept secure through hashing. In some implementations, every function may have a signature, every use of a function may have a signature, and every package of every use of a function may have a signature. The independent signatures at each level may be checked down the chain of hierarchy to ensure that each component in the chain is an authentic version of the component that is described by the metadata.

License terms may indicate the permitted types of uses of a component, the barred types of uses, and/or activities that are to be performed (e.g., that must be performed) in order to use a component. For example, a license may allow non-commercial use and/or commercial use. A license may impose a fee, such as a fee per execution, a fee to allow execution during a period of time, or a fee to allow unlimited execution after payment of the fee. A license may require that any use include attribution, such as an identification of the creator of the component. In some instances, a particular component (e.g., a function, action type, plugin, etc.) may have multiple available licenses. For example, a function that a user creates may be used under a first license that allows non-commercial use for free, and that allows the licensee to modify the function. The same function may be used under a second license that allows commercial use for a $50 fee, but that does not allow modification. In some implementations, the code in the various components of an application may be protected such that the code is not visible to an end-user of the application. For example, code in a web browser may be obfuscated and/or minimized, and server-side code may not be accessible to the end-user.

If a user of the Platform (e.g., the configurator) wishes to incorporate a component into their application, such as a component available in the marketplace (described below), the Platform may help the user determine what license is appropriate for their application. For example, the user may want to use a particular package, but the license terms for use are such that he would not make any profit overall by using that packaged component in their application. The Platform may be configured to perform automated auditing at design time, to provide advice to a configurator. As another example, a user may be building an action type through the Platform, and the Platform may model the action type by analyzing the function(s) that are being included in the action type, the inputs and outputs of the function(s), and so forth. Based on the model, the Platform may determine that another action type already exists (e.g., in the marketplace) include the same or similar functionality. The Platform may provide information regarding the price, performance, or other characteristics of the already existing action type, to enable the user to choose whether to include that action type in their project instead of building their own (e.g., possibly redundant) action type.

Implementations may track the elements on various form(s) included in a plugin, and may also track the actions. As described above, user events performed on the element(s) (e.g., form object(s)) may trigger action(s). Accordingly, a plugin may also be described as a group of actions, forms with elements, and events that trigger the actions based on interactions with the elements. In some instances, a plugin may be created that is not tied to a form. Actions and elements may be independent and able to work within any form. Accordingly, a plugin may work within any suitable form.

In some implementations, the Platform may enable a user (e.g., configurator) to design functions and/or other components at other levels. For example, the Platform may include inputs and a user may click on an input and select it to be an input to a function. The user may specify a custom attribute on the object that the user clicked on, and the custom attribute may be a style of the object. For example, the custom attribute value may be a particular CSS ID which can be applied as a class to other elements, and that value may be used within the actions to create an extensible action type that can be placed anywhere on any form in any application. When that is applied in an onClick event to an element, for example, it brings that class to the element if the user picks the CSS ID on the element. Such extensibility provides for a distributable package, given that the package can be included in various applications (e.g., without extensive modification). The Platform enables a configurator to create an application even if they are not familiar with object oriented programming concepts.

Data sources may also be packages for use by various applications within the environment. A data source may correspond to a filter set as described above. A data source may be one or more of SQL table data, a flat file, serialized data, data from a key-value store, and/or other data formats.

In some implementations, packages at each level may be tracked by hashing the contents of the package to determine whether changes have been made to the contents of the package. A hash may be included in the metadata for a package, and a subsequent hash may be compared to the stored hash to determine whether the package has changed since the original hash was generated. A change to a package may lead to the creation of a new, derivative package, which may be assigned a different version number (e.g., version 1.1 derived from version 1.0). The license information in the metadata may be propagated into the new package as appropriate, as indicated by the user who created the new package. The Platform may automatically track changes made to the code of an application at the various levels, to prevent changes to ensure compliance with license terms, for example where a license indicates that a piece of code is not modifiable. The Platform may automatically track differences, add the attribution information to a package, identify differences between package versions, and/or track license terms and compliance based on the hash for a package. In some implementations, the UI of the Platform may enable a user to click on a package at any level and view license terms and/or other metadata associated with the package.

In some implementations, each packaged component may have a hash applied to it, and the hash may be based on the component itself (e.g., the function) as well as the other metadata in the package. The metadata may include a definition of an action type, function, or other component at another level. In some implementations, the hash at a function level may be employed to ensure that no other function is (e.g., maliciously) injecting code into the function in an attempt to alter the function's operation. The hash may be checked at runtime to verify it has not changed. In some implementations, the hash may be generated the first time that the function is loaded for execution, and the hash may be saved in memory. The hash may be checked to detect any changes to a package. Hashing may also be used to track versions of a package, and different versions of a package may be provided in the marketplace. As used herein, the runtime verification of the version and/or licensing of a component may be performed immediately prior to execution of the component and/or between a time when the executing application indicates that a component is to be executed and a time when the component is executed.

The first time an application is deployed for execution, the system may perform a hashing operation at each level for each component to determine a hash for each package included in the application. The license(s) available for each package at each level may be identified, and a signature may be determined for each package.

The signature may include authorship info (e.g., who created the package and/or packaged code), license terms, and/or the hash of the package and/or packaged code. In some instances, the package including its metadata may be hashed, and the hash may be stored in a data structure, e.g., a blockchain. In some implementations, the metadata may store information describing a relationship between the package license and the users who may use the package in an application. For example, the metadata may indicate users who are valid, current licensees of the package. Payment of license fees and/or distribution of packages may be managed through the marketplace.

In some implementations, the Platform may enable a user to create a toolkit that is a set of packages at any level. The toolkit may be a curation of packages. For example, a user may curate a toolkit that enables other users to readily put together a particular type of application. In some instances, a toolkit may be licensable to other users. Alternatively, a toolkit may not itself be licensed even though the packages within the toolkit may each have an associated license.

Checking of license terms may be performed during a runtime merge of code at various levels for an application. Such a runtime merge may be performed for a new deployment of an application, or for an incremental change to an application such as deployment of a new function, new action type, and so forth. If a license for any of the packages in the application is no longer valid, the user may be notified. In some instances, the user may be given a warning in advance of the license terms of a package are going to expire. In some implementations, the Platform may enforce obligations that a licensor as well as a licensee comply with terms of a license. For example, if a license indicates that the licensor is to provide advance notice (e.g., 30 days) prior to withdrawal of licensed rights, the Platform may ensure that all licensees are so notified.

Licensing may occur at the level of individual functions, and/or at higher levels such as at the action type level, action group level, and so forth. In some instances, higher level elements may be modified only to the extent that the licenses of the included components are also modifiable.

Metadata may be included in a package at every level. At the function level, the metadata may identify the various input arguments and outputs of a function. At the action type level, the metadata may describe relationships between the various functions in the action type. For example, the metadata may indicate that the output of a first function is to be used as an input argument to a second function in the action type. In some implementations, the metadata at each level may be described using a version of JSON.

At deployment of an application, a runtime merge may be performed to merge the various packages that are to be included in the executing application. An application may include various elements to be presented in forms, and various actions included in action groups. The actions may include any number of functions described in one or more programming languages, and such functions may be included in libraries that are loaded into a web browser for execution. Each of these components may have licensing as indicated in the metadata of its package, and each of the components may be signed independently of one another. The signature may be employed to enforce licensing terms and/or manage distribution of a package. In some implementations, the signature may be stored in a blockchain. The metadata of the various packages in an application may be processed during the runtime merge to enable execution of the application. In some implementations, the entire package and all of its associated metadata may be stored in a blockchain, including the signature, and the hash may be a hash of the entire package including the metadata. As described above, a package may be at any component level and/or may include any number of components at one or more levels.

A packaged code function may include the function itself and metadata that describes the function (e.g., the input and output arguments of the function). A function may be packaged individually for individual licensing, distribution, and/or use in application(s). The Platform supports the ability of a user to write a function that dynamically creates other functions at runtime. In such instances, the licensing terms of the first function may be propagated to the dynamically generated functions.

In some implementations, the Platform may include an editor that enables users (e.g., configurators) to create components such as functions, action types, elements, and so forth. Such components may be packaged through the Platform based on metadata that is provided by the user. The packaged components may be made available to configurators through a marketplace of the Platform. In some instances, the packaged components may be distributed to other users through a marketplace. The editor may enable the user to enter code for the components using any suitable programming language. In some implementations, a user may be required to achieve some level of certification by the Platform to be authorized to use the editor to write code. In this way, the Platform may control the quality of code being produced through the editor and added to the Platform. In some instances, the Platform may enable a user to incorporate code stored in an external code repository. For example, the user may point to a piece of code (e.g., function(s)) and the code may be retrieved. The Platform may package the code to include metadata describing the code.

In some instances, the metadata for a package may be provided by the user. In some instances, the metadata may be automatically generated based on an analysis of the code to be packaged. For example, a user may write a function in JavaScript™ or some other programming language. The function may be configured to change a CSS class of a particular element in a page. The user may model that function into a set of metadata that defines the set of inputs and/or outputs of the function and thus impose a common model that enables the function to be consumed into the Platform (e.g., used in application(s) that execute within the environment). The (e.g., JSON) metadata file may be included in the package for the function. In some implementations, the metadata of a package may be viewable by a user within the design interface of the Platform.

As described above, an action may receive inputs that were used as inputs to a function. A configurator may define the inputs to an action to create an action type. An action type is a configurable set of inputs that are the basis of a first set of arguments to a function in the code. Because each function may be associated with metadata that describes the inputs and outputs of a function, a user may reuse and/or recombine functions (e.g., written in the same or different language) to create an action type. For example, the user may indicate that the output of a first function in the action type is to be used as the input to a second function in the action type. The user may thus create the action type without needing to write any code, based on the metadata that describes the function(s).

The creation of packaged action types and/or other components of an application may be library agnostic. For example, a first function in an action type may be dependent on JQuery version 1.2, and a second function in the same action type may be dependent on JQuery version 2.5. During the runtime merge, e.g., at the first build of an application (e.g., project), the Platform may analyze the various forms within the application to be loaded, and also analyze all the actions corresponding to the forms. The Platform may then identify all the (e.g., JavaScript™) functions and server-side code functions corresponding to the actions, and determine any libraries and the appropriate versions of the libraries that are to be incorporated into the application. In instances where multiple versions of a same library are to be used in an application, as in the example above, the Platform may perform the necessary modifications to enable multiple versions to be used. For example, for languages where a particular control character (e.g., "$") is used for library incorporation, the control character may be modified (e.g., "$$") to enable the inclusion of different versions of the same library into the application.

After a first runtime merge of an application, the results of the merge may be cached and used during subsequent executions of the application. In some implementations, the deployment and/or execution environment may preload and cache a first view of the application to ensure better performance for actual end-users on a first load of the application. In some instances, this first preload and cache of the application may be performed through a headless browser that runs internally in the environment and that calls all functions that are to be pre-loaded and cached.

Implementations may also help users manage deprecated and/or no longer supported functions in libraries. For example, if an application includes a function in JQuery version 1.2, and that library is no longer going to support that function, the Platform may notify the user and/or recommend alternative functions (e.g., in the marketplace) that may provide the same or similar functionality. The user can swap that code out by changing pointers to point to a different function. The Platform may also make recommendations to a user regarding which functions, actions types, or other components may be best suited to the user's application. For example, the Platform may present a list of functions of similar functionality and provide comparison information such as metrics regarding efficiency of performance, price, license terms, programming languages of the functions, and so forth. As a particular example, a user may have written a function to add a watermark to an image. The Platform may model the user's function and identify another watermark-adding function that is available in the marketplace. The Platform may indicate that the other function may execute more efficiently than the user's function, to enable the user to choose whether to use the other available function. The Platform may also enable a user to swap in or swap out functions or other components during one or more current execution sessions of the application (e.g., using a resonance system) without any downtown of the application.

The marketplace may support a user community of various Platform users (e.g., configurators) to create packaged functions, action types, and/or other code components and share their creations through the marketplace. The marketplace may enable users to communicate with one another to seek advice, make recommendations, rate and/or review each other's components, share toolkits that they have created, collaborate on projects, and/or otherwise interact with one another.

Figure 9:
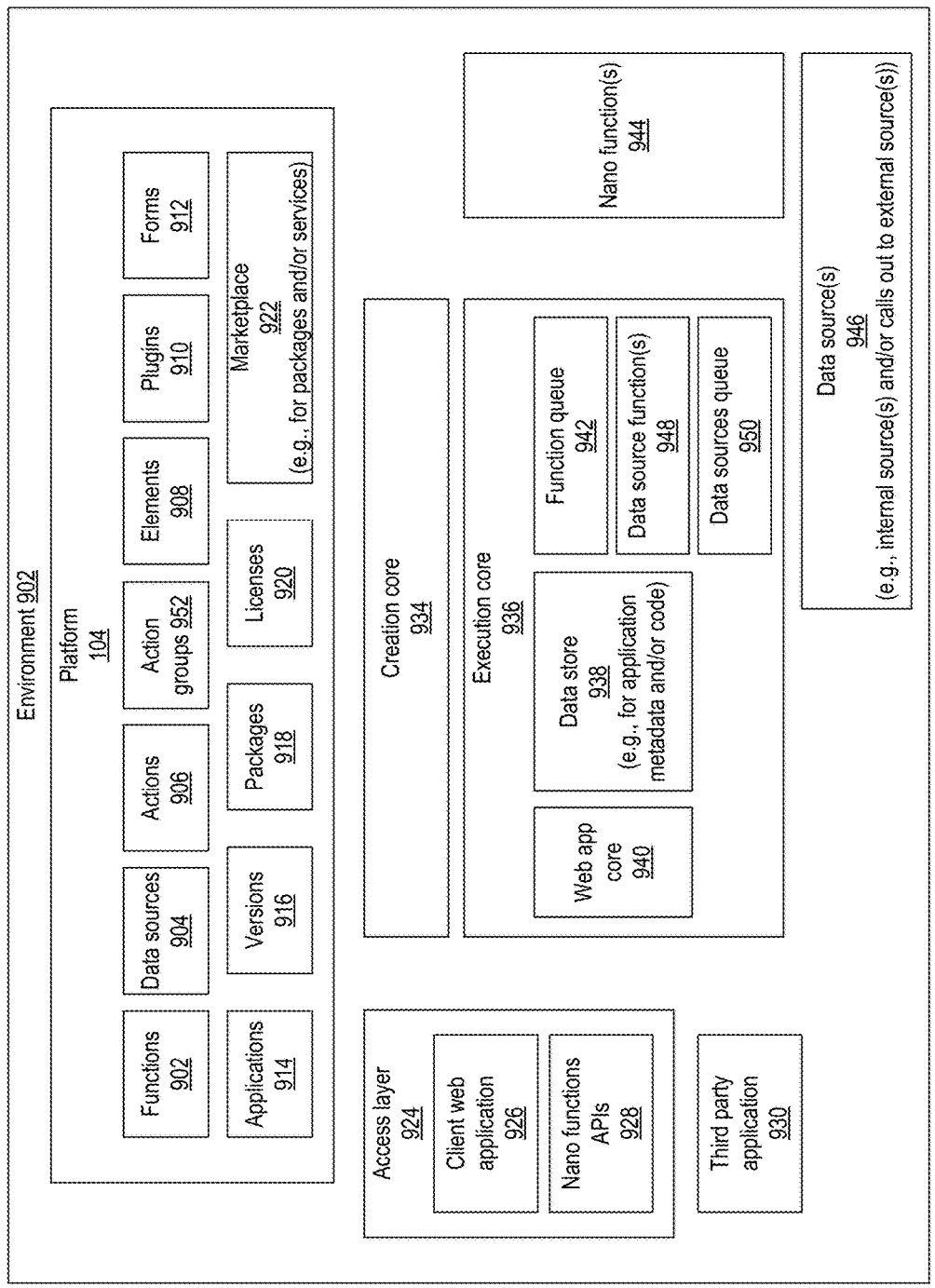
FIG. 9 depicts an example environment for providing nano functions, according to implementations of the present disclosure.

In some implementations, functions that execute as components of applications within the environment may be executed as nano functions. FIG. 9 depicts an example environment 902 for providing nano functions, according to implementations of the present disclosure. The environment 902 may be the deployment environment 126 in which applications 116 are deployed for execution. In some instances, the environment 902 may be a distributed computing infrastructure such as that provided by Microsoft Azure™.

As described above with reference to FIGS. 1-6, the Platform 104 may enable a user (e.g., configurator) to create an application through the combination of various components that are available through the Platform 104. As described with reference to FIG. 8, the components may include code components at various hierarchical levels such as functions 902, data sources 904, actions 906, action groups 952, elements 908, forms 912, and/or plugins 910.

The Platform 104 may also enable a user to access various applications 914 (e.g., previously created applications), versions 916 of the various components, packages 918 that include the various components, and licenses 920 for the various components. The Platform 104 may also include a marketplace 922 as described above. The marketplace 922 may provide a user with packages and/or services that have been created and shared by other users through the marketplace 922, as described above.

The various components that are created using the Platform 104 may be processed by a creation core 934 in the environment 902. The creation core 934 may package the components into packages and create metadata for the various components. The metadata may be stored in the data store 938 that is included in and/or accessible by the execution core 936. For example, a user may use the editor of the Platform 104 to write a function in Scala, Java, or some other programming language. In some instances, the user may provide a link to an external repository where the code may be found, such as GitHub. The user may provide a configuration file that includes the metadata for the function, such as a description of the input and output arguments for the function. In some implementations, the Platform 104 may provide a tool to automatically generate the configuration file and the metadata based on an analysis of the function. The creation core 934 may employ the configuration file to generate the metadata for the function. The creation core 934 may also incorporate licensing information into the metadata, and various other types of metadata to include in the package for the function. In some implementations, the creation core 934 may hash the function as described above and store the hash in the metadata. The creation core 934 may also encrypt the function. The creation core 934 may perform these operations with regard to other types of components at other hierarchical levels. In some implementations, the creation core 934 may be included in the Platform 104.

The environment may also include an execution core 936 that manages the execution of applications and/or application components within the environment. The execution core 936 may include a data store 938 that stores metadata for packaged application components at the various levels described above, such as metadata for functions, action types, action groups, element types, forms, plugins, data sources, and so forth. The data store 938 may also store information regarding licenses, versions, and/or hashes for packaged components, as described above. The data store 938 may store CSS, JavaScript, and/or other code for application components. In some implementations, the data store 938 may store any number of pre-loaded libraries, such as JavaScript™ libraries. The data store 938 may also store data sources such as the filter sets described above. The data store 938 may be a keyed and/or serialized data store of any suitable type and/or storage format. In some implementations, the metadata for a component may be stored in a same row and/or key as the code (e.g., the actual function) for the component, for components at various levels.

In some implementations, the execution core 936 includes a web app core 940 that performs operations for DNS routing, authentication, and so forth. The web app core 940 may include a system architecture controller and one or more application pages. In some implementations, the web app core 940 includes an application system cache. In some implementations, the execution core 936 may include a load balancer, traffic manager, or other component(s) that manage communications between the execution core 936 and the access layer 924 (described below).

The execution core 936 may also include a function queue 942, data source function(s) 948, and a data sources queue 950. The function queue 942 (or dispatcher) may manage communications between the execution core 936 and the nano function(s) 940, such as sending requests to the nano function(s) 940 to cause the instantiation of functions to be executed as nano functions, as described further below. The data source function(s) 948 may include various operations to interact with various data source(s) 946. The operations may include Get Data, New, Modify, Delete, Calculate, Mass Change, Duplication, New Storage Object, and so forth. The interactions with the data source(s) 946 may be managed through the data sources queue 950. In some implementations, the data source function(s) 948 may provide sole access to the data source(s) 946, e.g., the functions of the application may not have any other channel that is useable to access the data source(s) 946.

The data sources 946 may include any number of data sources, such as databases, graph databases, key-value data stores, file systems storing documents, and so forth. The data sources 946 may include any number of data source(s) that are internal to the environment. For example, in instances where the environment is provided by Microsoft Azure™, the data source(s) may include Azure SQL databases, Azure tables, Azure blobs, Azure documents, and so forth. The data sources 946 may also make calls out to other data sources that are external to the environment. For example, the data sources 946 may send HTTP requests or other types of communications to retrieve information from external data sources.

The function queue 942 may handle all incoming and outgoing communications with functions that are executing as nano functions. In some implementations, the function queue 942 may be employed as, or in conjunction with, an event service. The function queue 942 may handle all incoming and outgoing runtime events in the order in which they are received, for the currently executing applications. In instances where a function is configured to request and receive information from a data source (e.g., external or internal), the communications between the function and the data source may be processed through the function queue 942. For example, a particular function may send a request to an external data source (e.g., government web site), the request including argument for a year and a state. The web site may return a list of individuals who live in the state during the year and the ages of the individuals, based on collected census data. The function may then calculate an average age of the individuals based on the received list. In such examples, the request from the function may be received and processed by the function queue 942 which may employ the data source functions and/or data sources queue to send the request to the appropriate data source. The information received from the data source (e.g., the list of individuals and ages) may be processed through the function queue 942 and the information may be sent on to the function executing as a nano function. In this way, the execution core 936 may control incoming and outgoing communications with executing functions.

The access layer 924 may include one or more module(s) that provide access to the execution core 936. The access layer 924 may include one or more of the following: client web application(s) 926, and/or nano functions API(s) 928. In some instances, one or more third party application(s) 930 may call the API(s) 928 to access the functionality of the associated nano functions.

A client web application 926 may be an application that has been built using the Platform 104 as described above. As an application executes in the environment, an end-user may perform some operation (e.g., click on a UI form object) and an event may be triggered based on the operation. The event may be associated with an action type that includes one or more functions. The execution core 936 may receive, through the web app core 940, an indication of the function (s) to be executed. The execution core 936 may check licensing for the packaged functions, and employ the function queue 942 to cause a nano function to be executed (or a cached nano function container to be employed) for each of the function(s). Execution of nano functions is described further with reference to FIG. 10.

In some implementations, code is generated in the (e.g., single page) client web application 926, and code may not be generated using other modules shown in FIG. 9. HTML, CSS, and/or JavaScript may be generated in the client web application 926. A JavaScript function (e.g., firstrun.js) may be executed and may access the metadata and based on the metadata generates HTML, CSS, and/or other JavaScript to create the client view of the page. Core code (e.g., wrappers) may be the code of the execution core 936 itself, e.g., the code that creates the metadata for components. In some instances, this code may be written in ASP.net and/or C# in a .net framework. The code may access the metadata and delivers it into the client web application 926, where it is used to render the page for the end-user and generate other code. Inside the component metadata may be JavaScript code. Whether or not one of those JavaScript functions is consumed on the client side is determined by the metadata. For instance, if an action includes a code function, that code function may be presented to the client in rendered code, and otherwise it may not be presented. During a real-time merge, the metadata may be examined to determine what functions are needed and what metadata is needed for actions, elements, and/or other components. For example, a form may have a button on it for Add New Line Item. The metadata may define the form, the button, the event on selection of the button (e.g., onClick) that calls a function to perform action(s) in response to the event, and so forth. The function may have associated libraries that enable the function to work properly. The action(s) called in response to the event may use other function(s) to execute, and such function(s) may be in JavaScript that is delivered to the client and/or function(s) that are executed server-side, e.g., as nano functions. In some implementations, the Platform may generate metadata that describes these various components but may not generate the actual code for the functions. Such code may have been previously written and packaged into functions and/or other components at other levels. Such code may be consumed by the execution core to provide the application to the end-user, but may not be part of the execution core.

The access layer 924 may also expose nano functions API(s) 928 that processes may call into to request the execution of a function as a nano function. The nano functions API(s) 928 may bypass the web app core 940 and interact (e.g., directly) with the execution core 936 to request the execution of functions as nano functions. The execution core 936 may also check licensing of functions for requests received through the nano functions API(s) 928.

In some implementations, the third party application(s) 930 may employ the nano functions API(s) 928 to request function execution through the execution core 936. In some instances, third party application(s) 930 may be other applications that are executing in the same infrastructure (e.g., cloud computing) environment as the environment 902, e.g., on a different internal network of the infrastructure environment than the other elements of FIG. 9. By routing all requests for function execution through the execution core 936, implementations may ensure license compliance regardless of the particular access layer used to initiate the requests.

Figure 10:
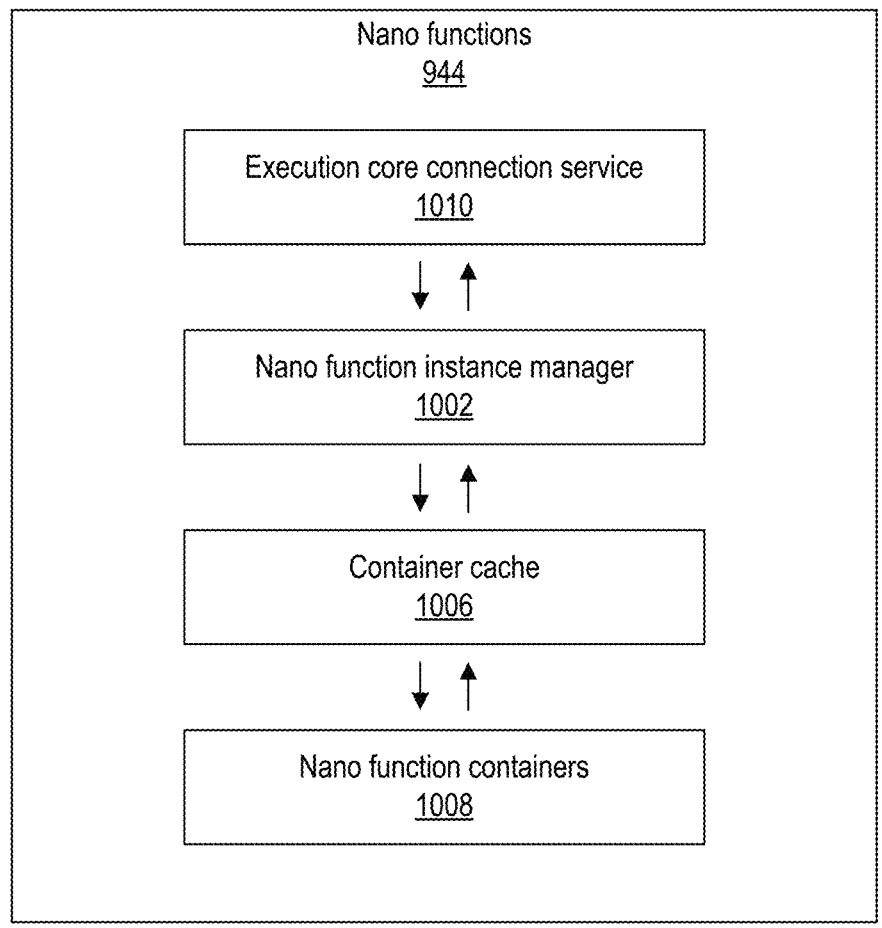
FIG. 10 depicts an example of a nano functions architecture, according to implementations of the present disclosure.

FIG. 10 depicts an example of a nano functions architecture that may be employed by the nano functions 944, according to implementations of the present disclosure. As described above, a function may be a reusable function that accepts input parameter(s), performs various operations, and returns one or more output value(s) that are determined based on the operations. As in the example above, a function may receive an input of a list of ages of individuals and output an average age of the individuals. In some implementations, functions executing with the environment are exposed as nano functions.

As used herein, a nano function is an instance of a single function that operates according to a pure functional paradigm. In a pure functional paradigm, each function executes independently of other functions, such that the operation of one function does not affect the operation of another function. In some instances, an output from one function may be used as an input to another function, where the two functions may be included in a same action type. However, in a pure functional paradigm, a first function may not make a call out to a second function from within the first function. Accordingly, in a pure functional paradigm a function, operates immutably and deterministically, such that particular input(s) to a function always cause the function to produce the same output. The operation of the function does not depend on any hidden values and/or state.

As shown in the example of FIG. 10, the nano functions environment 944 may include a nano function instance manager 1002, a container cache 1006, and any number of nano function containers 1008. In some implementations, the instance manager 1002 may be a Kubernetes™ instance manager. In some implementations, the nano functions environment 944 may include a common code serialization module to impose a common serialization on functions written in different languages (e.g., Java, nodejs, Scala, etc.). In some implementations, the common code serialization module may be omitted from the nano functions environment 944. Instead, a web service may be available for each code language, and the web services may impose a common serialization format. The nano function containers 1008 may each include an executing instance of a function. The container cache 1006 may store any appropriate number of (e.g., cached) nano function containers 1008. In some implementations, a container manager may manage instances of the nano function containers 1008. Some implementations may employ Docker™ container management. The nano functions environment 944 may also include an execution core connection service 1010 that facilitates communications between the execution core and the nano functions environment. This service may exist in the virtual machines as well as inside the core, to facilitate the communications between the core and the nano functions.

In some implementations, the nano functions environment 944 may be an isolated environment that is separate from the execution core, for security and for runtime optimization. Web services may operate to execute the nano functions.

The function queue 942 may call into the instance manager 1002 to request an instance of a function to be executed. A determination may be made whether there is a currently active container for the requested function. If so, the active container may be employed to satisfy the request. A single container instance may be employed for any number of executions of a function. In some implementations, the container instance may remain active so long as any application is using the function included in the container. If a function is used infrequently, a request for the function may cause the nano functions to instantiate (e.g., spin up) a container for the function that was previously sitting dormant in the container cache 1006, send the input arguments to the function, receive the output arguments, and then kill the container instance if no other incoming requests are being received for the function. In some instances, a container instance for the function may be stored in the container cache 1006 to be ready for a subsequent call if there are not currently any requests for the function.

On receiving a request for a function, the nano functions 944 may determine whether there is a currently active container instance for the function. If so, the active container instance may be employed to satisfy the request as described above. If there is no currently active container instance, a determination may be made whether there is a cached container instance. If so, the cached container instance may be activated and used to satisfy the request. If there is no currently active or cached container instance for the function, a container may be instantiated and used to satisfy the request. After the function execution instance is complete, a determination may be made whether to cache the container instance or to kill it. In some implementations, this determination may be based on usage data indicating the past usage of the function. If the function has previously been requested at a higher than threshold frequency, the container instance may be cached. Otherwise, the container instance may be killed. Accordingly, implementations may use predictive modeling of function usage to determine whether to cache and/or keep alive a container instance for a particular function, to achieve an optimal use of memory, storage, and processing resources.

Because the functions adhere to a pure functional paradigm as described above, the output(s) of particular functions based on particular input argument(s) may also be cached and used. For example, a function may output X in response to inputs A, B, and C, and the output value X may be cached and mapped to inputs A, B, and C. For subsequent calls to the function with the same inputs A, B, and C, the cached output X may be retrieved and returned instead of re-executing the function. This caching of output values may save processing resources by avoid unnecessary re-execution of functions. The resources saved may be considerable in instances where the function is complex and/or performing a large number of processing-intensive operations. The cached output values may be good for an indefinite period of time for a particular version of a function. As described elsewhere herein, a hash may be generated for a function at execution time, and the generated hash may be compared to a previously stored hash to determine whether the function has changed. If the function has changed, then it is a new version of the function and the cached outputs may no longer be valid. If the function has not changed, then the cached outputs are still valid and may be used instead of re-executing the function.

The hash-based versioning of functions may also enable the Platform 104 to suggest various execution options to a user. For example, a user may have configured an application to use a particular version of a function, and the Platform 104 may identify a new version of the function that is available (e.g., a version with a different hash). The user may then swap in the new version of the function for the old version in their application at runtime, and determine whether the new function is suitable to be used within the existing application, without having to rebuild the application or recode other portions of the application. Accordingly, implementations enable A-B testing of a function within an application without the need to rebuild the application.

In some implementations, the Platform may model a function based on all possible outputs for all possible inputs, and determine similarity between the function and other function(s) that exhibit similar behavior. The other function(s) may then be suggested as alternatives to a user, e.g., if the others have different price, license terms, performance characteristics, and so forth. In some implementations, the modeling of a function within the application enables the Platform to determine the performance of each portion of an application, how long each portion takes to execute, where the pain points may be as far as processor usage and/or execution time, and so forth. The Platform may use the results of such an analysis to recommend various packaged functions and/or other packaged application components for use within in application.

The containerized functions, executed as nano functions, may include all the prerequisite information needed for the function to be executed. For example, the container may include the executable code for the function itself, a call stack for inputs and outputs to the function, and/or other elements. The container may also include version and/or license information. For example, a first version 1.1 of a function may execute in different separate container from a second version 1.2 of the same function. The separate containerization of each different version of the function may provide advantages for output caching as described above. The separate containerization may also facilitate license management, given that different versions of a function may have different license terms and/or may be separately licensed to different individuals.

At creation time, when a user (e.g., configurator) is designing an application using the Platform 104 and creating an action type that uses a function, the user may choose which version of the function to be included in the action type. In instances where multiple licenses are available for the function, the user may also select which license under which to use the function. The action type may be built and packaged, and the included function may be packaged with metadata that identifies the function, the version of the function, and the selected license for the function. In instances where a fee is paid for the license, the metadata may also indicate the user as a valid licensee of the function for an appropriate term, if any (e.g., assuming the payment is verified). At execution time, the execution core may check the license, and/or the licensee, to make sure that the license is still valid. The execution core may indicate to the function queue which version of the function to be instantiated and executed.

Figure 11:
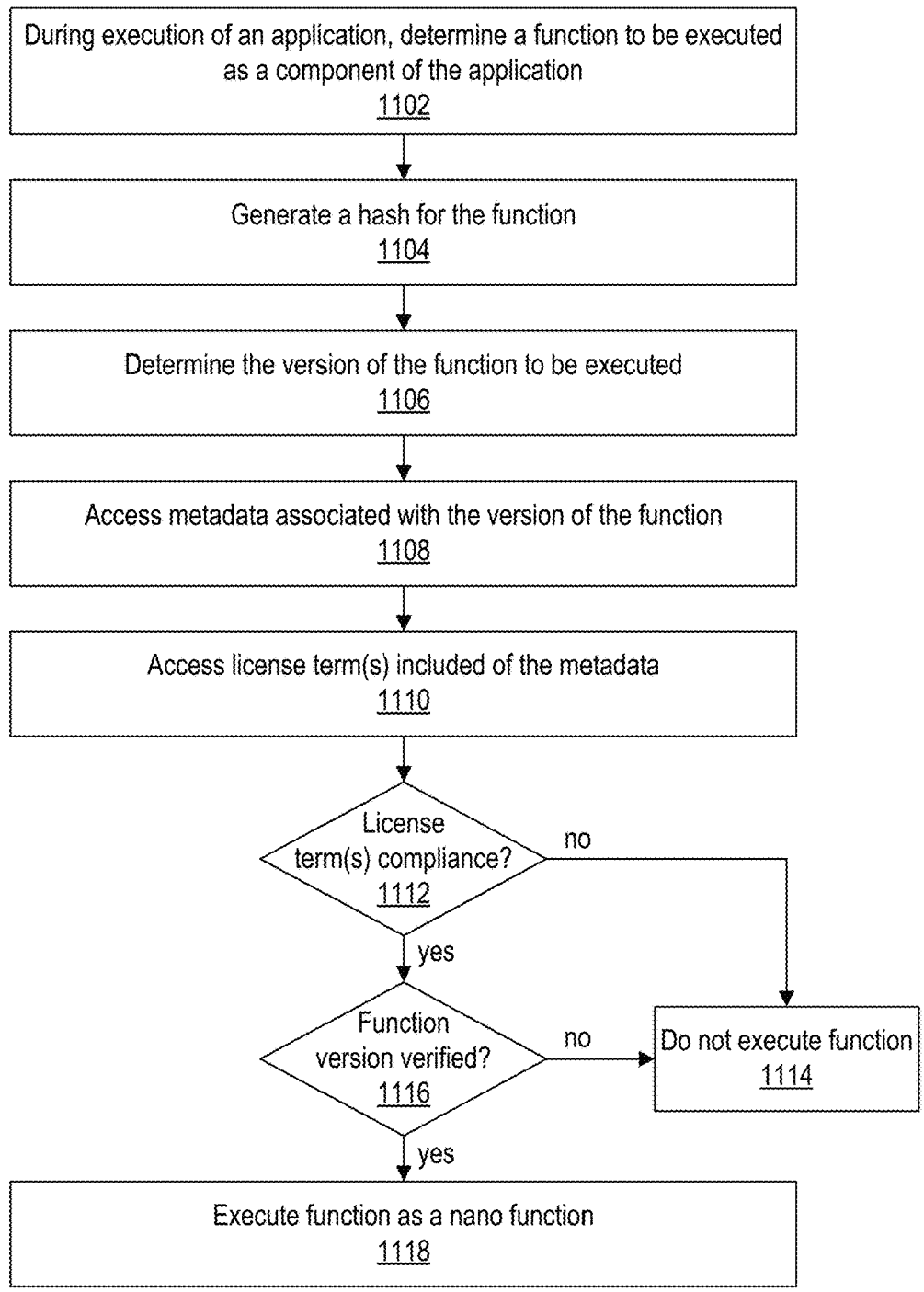
FIG. 11 depicts a flow diagram of an example process for runtime checking of licensing and/or versioning for application components, according to implementations of the present disclosure.

FIG. 11 depicts a flow diagram of an example process for runtime checking of licensing and/or versioning for application components, according to implementations of the present disclosure. Operations of the process may be performed by the execution core 936 and/or other software module(s) executing within the environment 902.

During execution of an application, a determination may be made (1102) of a function to be executed as a component of the application. In some implementations, the application may be a client web application 926 that is executing within the environment 902. The application may also be a third party application 930 that is executing in a different network of the environment 902 or externally to the environment 902, and calling into the execution core 936 using the nano functions APIs 928 as described above. The application may include components arranged hierarchically at multiple levels as described with reference to FIG. 8. Accordingly, the application may include one or more action types included in action group(s) that are included in plugin(s) included in the application. The determined function may be a subcomponent of an action type. Alternatively, the determined function may be requested for individual execution through the nano functions APIs 928.

In some implementations, a hash may be generated (1104) for the function to be executed. A determination may be made (1106) of a version of the function to be executed. In instances where the function is included in an action type of the application, the metadata of the packaged action type may indicate which version of the included function is to be executed. In instances where the request for function execution is received through a nano functions API 928, the particular API that is called may correspond to the particular version of the function to be executed. Alternatively, a nano functions API 928 for a function may take an input argument that specifies the particular version of the function to be executed. APIs 928 may be versioned accordingly to the versions of the associated functions.

In some implementations, the API for a function may act as a service for the function, e.g., for one or more versions of the function. A caller may pass a token to the API along with the input parameters for the function, and the API may call the appropriate version of the function based on the token using the provided parameters. Each available version of the function may be associated with a particular token, such that the provided token indicates which version is to be called through the API. The API may request, through the execution core, that the version of the function be called with the parameters. The execution core may then provide the return value of the function, if any, to the API which may return the return value to the caller. The execution core may return the return value in JSON to the API. In some implementations, each license instance of the function may be associated with a particular token. For example, different tokens may be used to request an execution of the function according to a different set of license terms.

Metadata that is associated with the determined function version may be accessed (1108). As described above, in some implementation each function (and each other application component) may be packaged with the metadata that describes the component. The metadata may include a hash of the function (e.g., a known good hash), version information, license information, and so forth.

The license term(s) included in the metadata may be accessed (1110) to determine whether this particular use of the function is still licensed. For example, the metadata may include a list of authorized licensee(s) of the function, and the user may be compared to the authorized licensee(s) to determine whether the user is an authorized licensee. The term of the license may also be checked, e.g., in instances where the license is valid for a period of time. In some instances, a check may be made whether the appropriate fee has been paid, in instances where the license specifies payment of a fee by the licensee to the licensor. The license term(s) may be checked (1112) against the current use and/or user. If the current use and/or user does not comply with the license terms, the function may not be executed (1114). If the current use and user complies with the license terms, the process may proceed.

In some implementations, the version of the function may be checked (1116) at runtime to ensure that the function has not been altered. This check may include comparing a current hash of the function to a previously determined and stored hash, to determine whether the function has changed. If the function version is not verified, the function may not be executed (1114). If the function version is verified, the process may proceed and the function may be executed (1118). In some implementations, the function may be executed as a nano function as described above.

FIG. 11 depicts the version checking, hashing, license checking, and/or other operations performed with regard to components at the function level. Similarly, implementations may also check hashes, licensing, versions, and perform similar operations for components at other levels such as actions, action groups, forms, elements, data sources, and so forth. Accordingly, the process of FIG. 11 may be performed for other components at other levels. In instances where the process is at another level, in some cases there may not be any functions to be executed in the final steps, e.g., if the component, such as a form, does not include any functions. In such cases, the hash, version, and/or licensing of the component may still be checked at runtime as described above.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   during execution of an application, determining, by the at least one processor, a function to be executed as a component of the application;
   accessing, by the at least one processor, metadata associated with the function, the metadata including at least one term for executing the function; and
   based at least partly on verifying, by the at least one processor, that the execution of the function complies with the at least one term, executing the function as a nano function that executes, independently of other functions, in a locally executing instance of a container that does not include another executing function.

2. The method of claim 1, wherein:
   the at least one term includes at least one license term; and
   verifying that the execution of the function complies with the at least one term includes verifying that at least one of a licensed use or a licensed user of the function complies with the at least one license term.

3. The method of claim 1, further comprising:
   determining, by the at least one processor, a version of the function to be executed; and
   verifying, by the at least one processor, that the version of the function has not been altered and, in response, executing the function as the nano function.

4. The method of claim 3, wherein the verifying that the version of the function has not been altered is based at least partly on a hash of the function at runtime.

5. The method of claim 1, wherein the function is included in an action type that is a higher-level component of the application in a hierarchical arrangement of application components.

6. The method of claim 1, further comprising:
   determining, by the at least one processor, that the instance of the container is currently executing and, in response, employing the currently executing instance of the container to execute the single function.

7. The method of claim 1, further comprising:
   determining, by the at least one processor, that the instance of the container is in a container cache and, in response, activating the instance of the container to execute the single function.

8. The method of claim 1, further comprising:
   determining, by the at least one processor, that the instance of the container is not currently executing and is not in a container cache and, in response, creating and executing the instance of the container to execute the single function.

9. The method of claim 1, wherein executing the function as a nano function includes:
   identifying, by the at least one processor, at least one cached output value that corresponds to at least one current input argument to the function and, in response, using the at least one cached output value as at least one current output value of the function.

10. A system comprising:
    at least one hardware-based processor; and
    a memory communicatively coupled to the at least one hardware-based processor, the memory storing instructions which, when executed by the at least one hardware-based processor, cause the at least one processor to perform operations comprising:
    during execution of an application, determining a function to be executed as a component of the application;
    accessing metadata associated with the function, the metadata including at least one term for executing the function; and
    based at least partly on verifying that the execution of the function complies with the at least one term, executing the function as a nano function that executes, independently of other functions, in a locally executing instance of a container that does not include another executing function.

11. The system of claim 10, wherein:
    the at least one term includes at least one license term; and
    verifying that the execution of the function complies with the at least one term includes verifying that at least one of a licensed use or a licensed user of the function complies with the at least one license term.

12. The system of claim 10, further comprising:
    determining a version of the function to be executed; and
    verifying that the version of the function has not been altered and, in response, executing the function as the nano function.

13. The system of claim 12, wherein the verifying that the version of the function has not been altered is based at least partly on a hash of the function at runtime.

14. The system of claim 10, wherein the function is included in an action type that is a higher-level component of the application in a hierarchical arrangement of application components.

15. The system of claim 10, further comprising:
determining that the instance of the container is currently executing and, in response, employing the currently executing instance of the container to execute the single function.

16. The system of claim 10, further comprising:
determining that the instance of the container is in a container cache and, in response, activating the instance of the container to execute the single function.

17. The system of claim 10, further comprising:
determining that the instance of the container is not currently executing and is not in a container cache and, in response, creating and executing the instance of the container to execute the single function.

18. One or more computer-readable media storing instructions which, when executed by at least one hardware-based processor, cause the at least one hardware-based processor to perform operations comprising:
during execution of an application, determining a function to be executed as a component of the application;
accessing metadata associated with the function, the metadata including at least one term for executing the function; and
based at least partly on verifying that the execution of the function complies with the at least one term, executing the function as a nano function that executes, independently of other functions, in a locally executing instance of a container that does not include another executing function.

19. The method of claim 2, further comprising:
determining that the function does not comply with the at least one license term and, in response, disabling the execution of the function as a nano function in the locally executing instance of the container that does not include another executing function.

20. The system of claim 11, further comprising:
determining that the function does not comply with the at least one license term and, in response, disabling the execution of the function as a nano function in the locally executing instance of the container that does not include another executing function.

* * * * *